US010990869B2

(12) United States Patent
Mei et al.

(10) Patent No.: US 10,990,869 B2
(45) Date of Patent: Apr. 27, 2021

(54) TAG SYSTEM IMPLEMENTING A NORMAL-ON ANTENNA AND METHODS OF USE

(71) Applicant: Palo Alto Research Center Incorporated, Palo Alto, CA (US)

(72) Inventors: Ping Mei, San Jose, CA (US); JengPing Lu, Fremont, CA (US); Kent Evans, Sunnyvale, CA (US); Janos Veres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 217 days.

(21) Appl. No.: 16/391,456

(22) Filed: Apr. 23, 2019

(65) Prior Publication Data

US 2020/0342280 A1    Oct. 29, 2020

(51) Int. Cl.
*G06K 19/073* (2006.01)
*G06K 7/10* (2006.01)
*G06K 19/077* (2006.01)
*G06K 19/07* (2006.01)
*G06Q 10/08* (2012.01)

(52) U.S. Cl.
CPC ... *G06K 19/07345* (2013.01); *G06K 7/10009* (2013.01); *G06K 19/0726* (2013.01); *G06K 19/07701* (2013.01); *G06Q 10/087* (2013.01)

(58) Field of Classification Search
CPC ......... G06K 19/07345; G06K 7/10009; G06K 19/07701; G06K 19/0726; G06Q 10/087
See application file for complete search history.

(56) References Cited

U.S. PATENT DOCUMENTS

| | | | |
|---|---|---|---|
| 10,628,725 B1* | 4/2020 | Mei | G06K 19/0724 |
| 2005/0253723 A1 | 11/2005 | Shafer | |
| 2011/0140853 A1 | 6/2011 | Jung et al. | |
| 2012/0040610 A1 | 2/2012 | Moosavi et al. | |
| 2014/0253333 A1 | 9/2014 | Patterson et al. | |
| 2016/0056444 A1 | 2/2016 | Hwang et al. | |
| 2017/0256155 A1 | 9/2017 | Sengstaken, Jr. | |
| 2018/0093814 A1 | 4/2018 | Espinosa | |
| 2018/0288889 A1 | 10/2018 | Fordham et al. | |

* cited by examiner

*Primary Examiner* — Sonji N Johnson
(74) *Attorney, Agent, or Firm* — Fox Rothschild LLP

(57) ABSTRACT

Systems and methods for operating a tag system. The methods comprising: wirelessly communicating, from a tag, a first signal at a first frequency spectrum that allows a tag reader to detect the first signal, when the tag is not proximate to an antenna modulation marker or when the antenna modulation marker has a first orientation relative to the tag; and performing operations by the tag to wirelessly communicate a second signal at a second frequency spectrum that does not allow the tag reader to detect the first signal, when the tag is proximate to the antenna modulation marker or when the antenna modulation marker has a second different orientation relative to the tag.

22 Claims, 20 Drawing Sheets

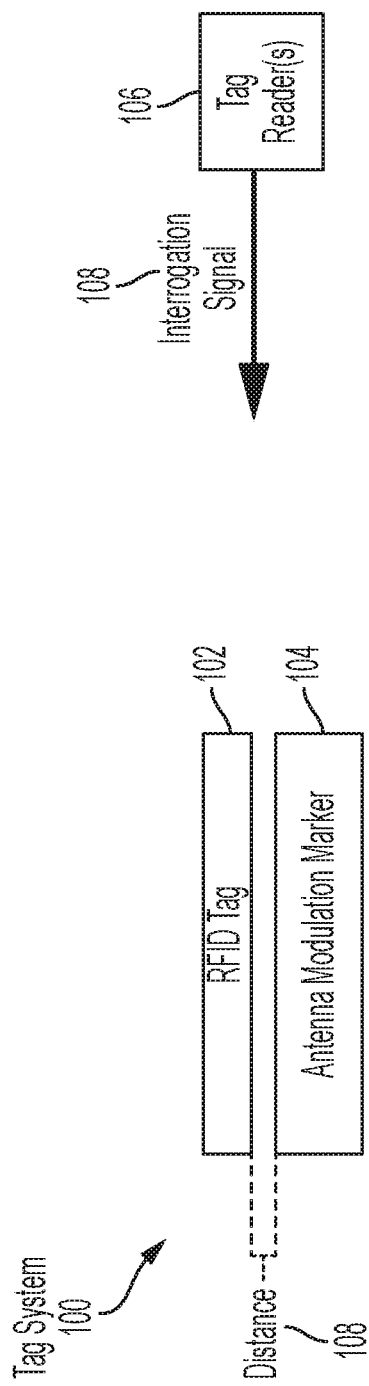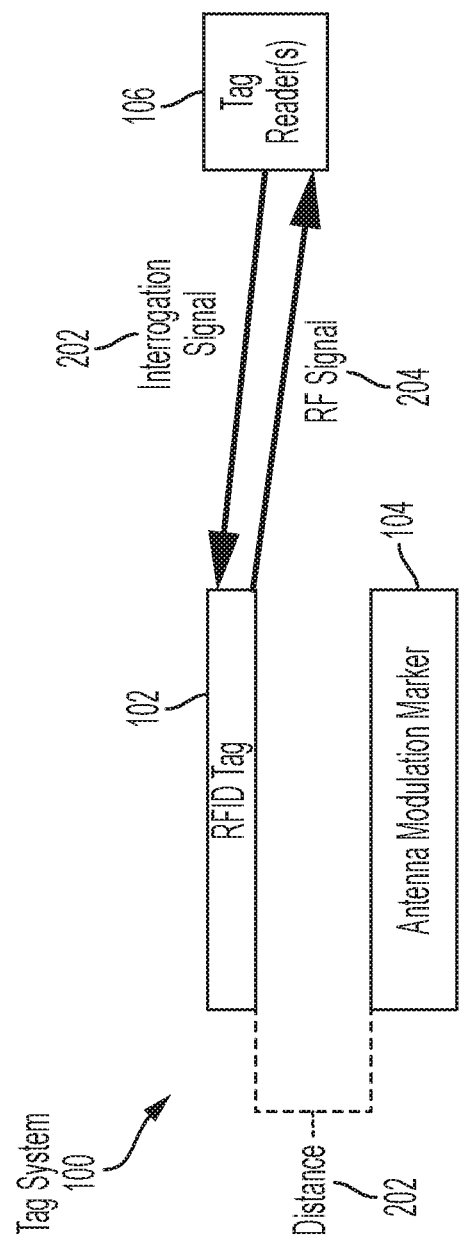

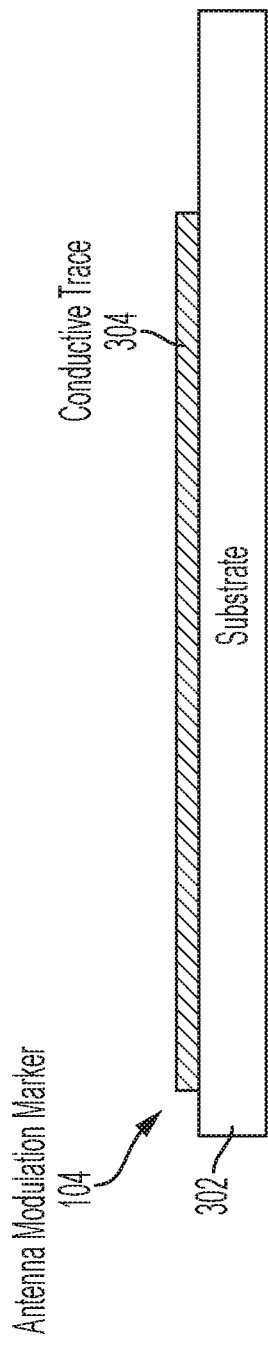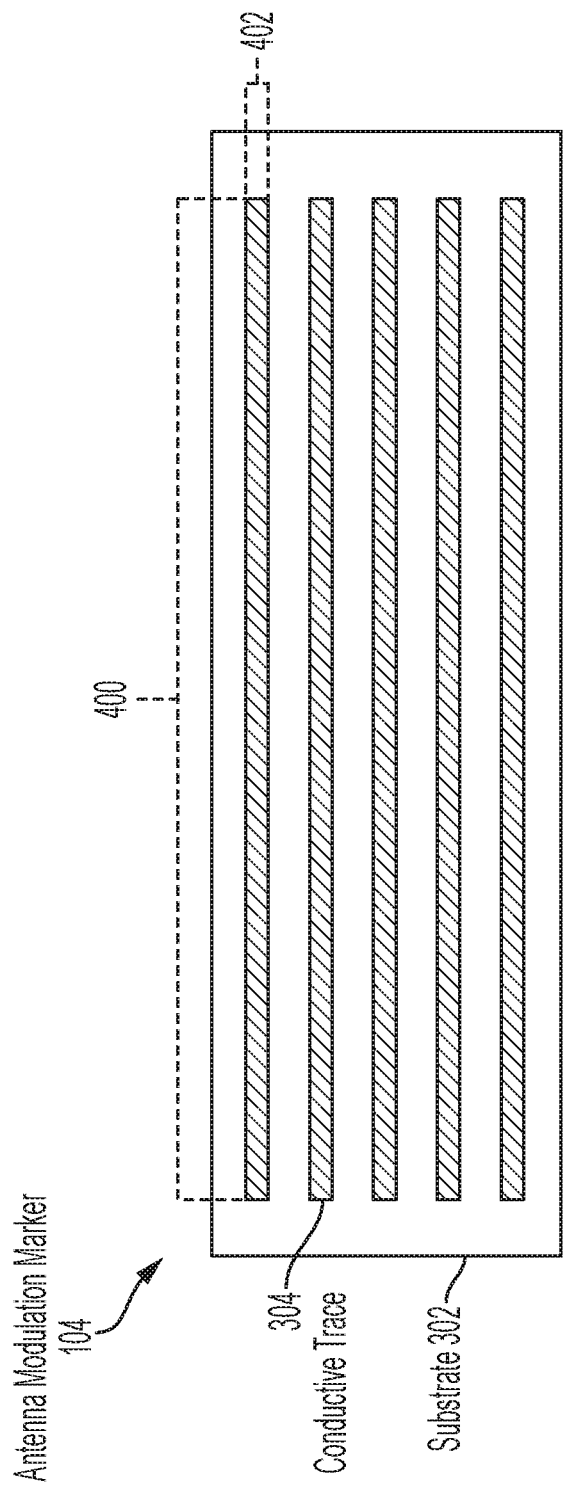

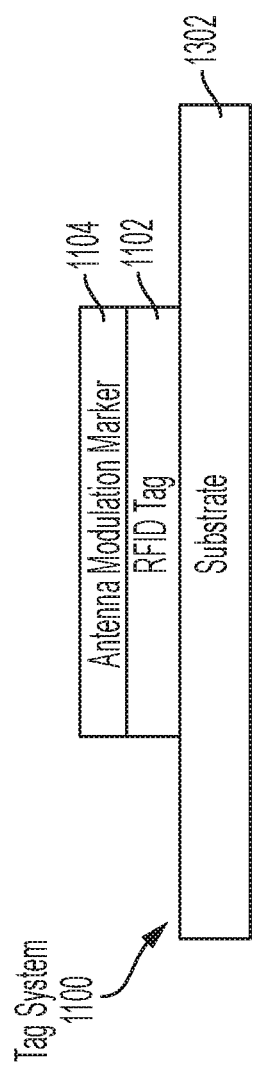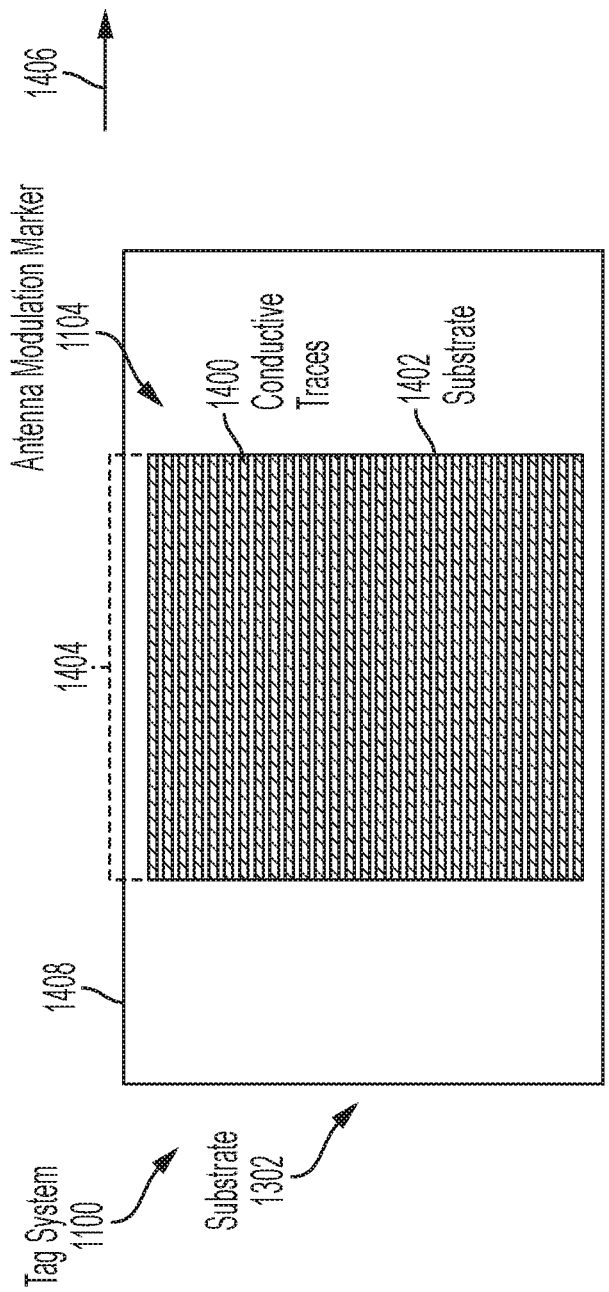

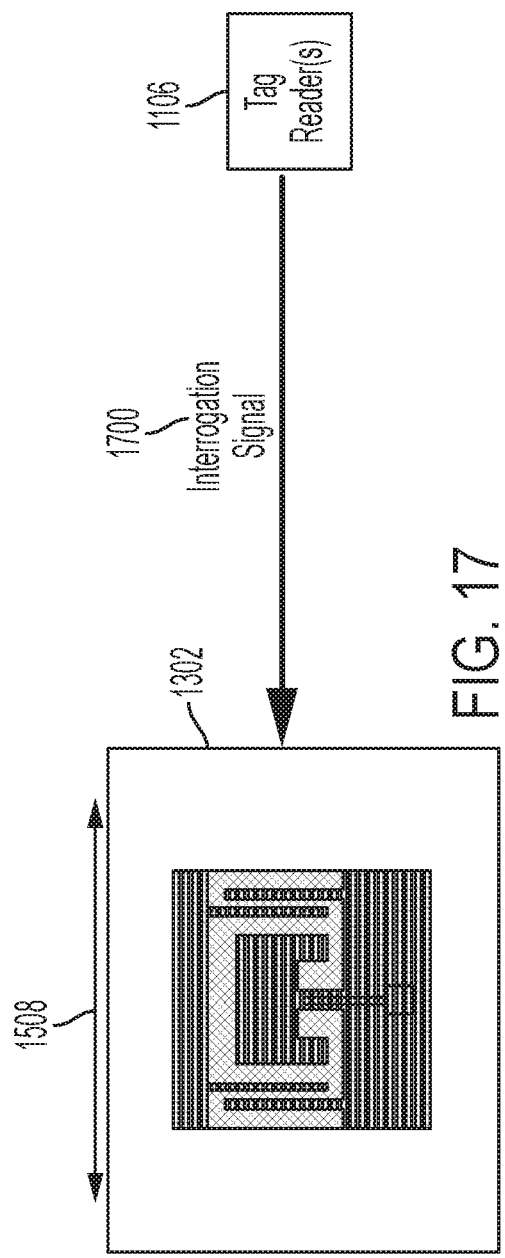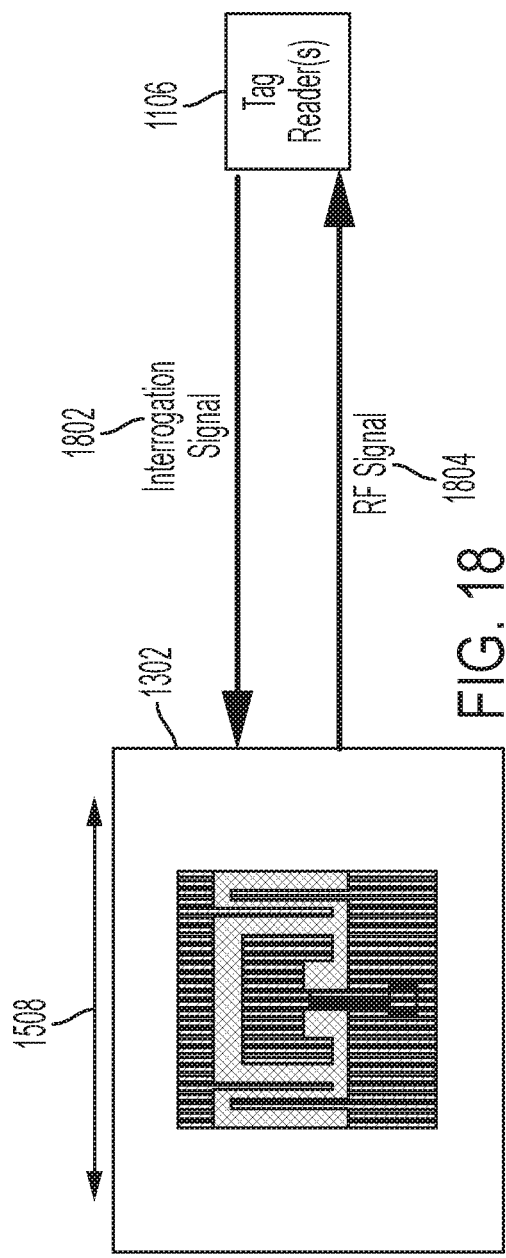

TAG SYSTEM IMPLEMENTING A NORMAL-ON ANTENNA AND METHODS OF USE

BACKGROUND

The present disclosure relates generally to tag systems implementing normal-on antennas and methods of use. In the conventional art, Radio Frequency Identification ("RFID") has been broadly used for object identification. However, for a Point Of Sale ("POS") application, it is difficult to tell whether the object with an RFID tag is on a shelf or has been taken off the shelf but still in the vicinity of the same. Although at a given gain of an RFID tag reader the signal strength is inversely proportional to the distance between the reader antenna and the RFID tag, there is no clear distance separation between a strong RF signal and a weak RF signal.

SUMMARY

The present disclosure concerns implementing systems and methods for operating a tag system. The method comprises: wirelessly communicating, from a tag, a first signal at a first frequency spectrum that allows a tag reader to detect the first signal, when the tag is not proximate to an antenna modulation marker or if the antenna modulation marker has a first orientation relative to the tag; and performing operations by the tag to wirelessly communicate a second signal at a second frequency spectrum that does not allow the tag reader to detect the first signal, when the tag is proximate to the antenna modulation marker or when the antenna modulation marker has a second orientation relative to the tag. The second orientation is different than the first orientation.

In some scenarios, the tag is coupled to a first item and the antenna modulation marker is coupled to a second item. The first item comprises an object that is part of an inventory and the second item comprises storage equipment that is part of an infrastructure for storing inventory, or vice versa. Alternatively, the first item comprises a support plate of a depressible button and the second item comprises at least one resilient member coupled to the support plate of the depressible button (or vice versa), or the first item comprises a stationary part of a rotary knob and the second item comprises a rotatable part of the rotary knob (or vice versa).

In those or other scenarios, the antenna modulation marker is configured to modulate a communications behavior of the tag. The modulation of the communications behavior of the tag is achieved by changing a resonant frequency of the tag, attenuating an amplitude of a signal generated by the tag, shifting a phase of the signal generated by the tag, and/or changing a polarization of a backscatter signal.

The antenna modulation marker comprises a plurality of conductive traces disposed on a substrate. The elongate lengths of the conductive traces are angled relative to a dipole antenna direction of the tag when the antenna modulation marker is in the first orientation, and extend parallel or substantially parallel to a dipole antenna direction of the tag when the antenna modulation marker is in the second different orientation.

BRIEF DESCRIPTION OF THE DRAWINGS

The present solution will be described with reference to the following drawing figures, in which like numerals represent like items throughout the figures.

FIGS. 1-2 provide illustrations that are useful for understanding the present solution.

FIGS. 3-4 provide illustrations of an illustrative architecture for the antenna modulation marker shown in FIGS. 1-2.

FIGS. 13-14 provide illustrations of an illustrative architecture for the tag system shown in FIGS. 11-12.

FIGS. 17-18 provide illustrations that are useful for understanding how the tag system shown in FIGS. 11-16C interacts with a tag reader.

DETAILED DESCRIPTION

Figure 5:
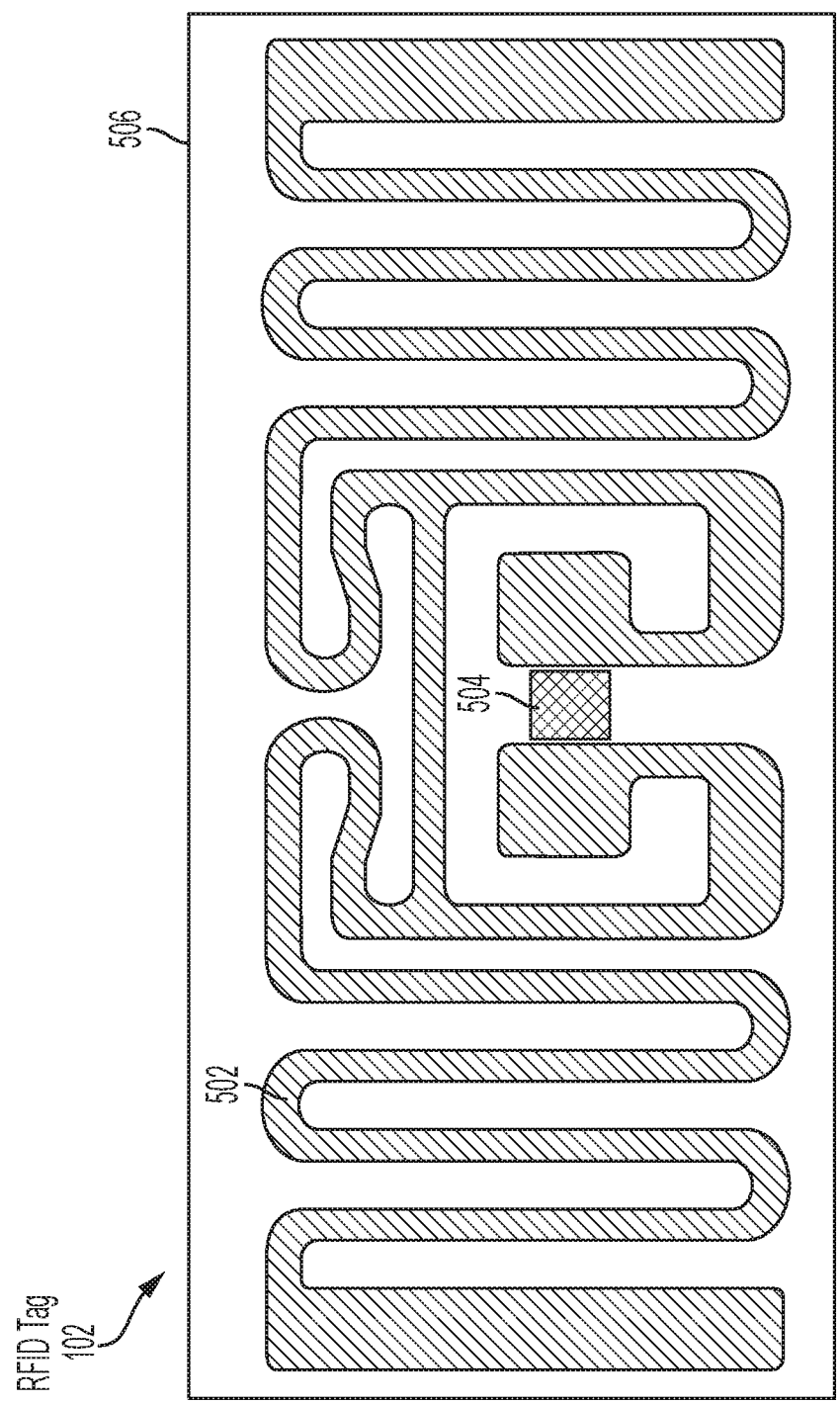
FIG. 5 provides an illustration of an illustrative architecture for the RFID tag shown in FIG. 1.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns tag systems implementing normal-on antennas and methods of use. The tag systems comprise tags, antenna modulation markers, and tag readers. The tags include, but are not limited to, RFID tags, Near Field Communication ("NFC") tags, and/or Bluetooth enabled tags. Each tag generally comprises an antenna, a substrate and a communication circuit capable of transmitting and receiving wireless signals. Each antenna modulation marker comprises one or more conductive or semi-conductive traces disposed on a substrate. The tag readers can be mobile tag readers or fixed tag readers strategically placed in a facility (e.g., in a ceiling, on or below a shelf of a display equipment, or as part of a POS checkout counter).

During operation, a tag reader transmits an interrogation signal. A tag responds to the interrogation signal in a detectable manner when the tag is not in proximity (e.g., not within 0-10 mm) to any antenna modulation marker or the tag is in a first orientation relative to a respective antenna modulation marker. The tag does not respond to the interrogation signal in a detectable manner when the tag is in proximity (e.g., within 0-10 mm) to the antenna modulation marker or the tag is in a second different orientation relative to the respective antenna modulation marker.

The present solution has many advantages. For example, the present solution may provide a means to identify a relatively large number of objects or items using a single tag reader, more accurately determine locations of objects and items in a facility (e.g., on particular shelves or display equipment) using one or more tag readers and/or having depressible RFID elements (momentary or bistable) for user remote input command.

The present solution can be used in many applications. These applications include, but are not limited to, POS applications, inventory applications, object tracking applications, and/or any other application in which an object's location needs to be determined. In addition, the solution enables user input wirelessly. The features of the present solution will become more evident as the discussion progresses.

The present solution will be described below in relation to RFID technology. The present solution is not limited in this regard. The present solution can be used with NFC technology, Bluetooth technology or other communication technologies in which modulation of tag communication characteristics is possible.

Illustrative Systems

Referring now to FIGS. 1-2, there are provided schematic illustrations that are useful for understanding a tag system in accordance with the present solution. RFID tags are well known in the art for marking and identifying objects. In many applications, it is desirable to measure the exact location of objects with RFID tags. This can be achieved with triangulation systems and/or using multiple antennae, which can be complex and costly. There is a need for simpler and lower cost object location monitoring systems.

It has been discovered that RFID tags can be turned into a part of an object identification system able to monitor object location by devising a novel RFID tag system. As shown in FIGS. 1-2, the novel RFID tag system 100 comprises a least one RFID tag 102 and at least one antenna modulation marker 104. The antenna modulation marker generally comprises a passive structure having physical and material properties that affect communication characteristics of a tag antenna whereby the output signal from the tag is modified. The RFID tag 102 is applied to a first item and the antenna modulation marker 104 is applied to a second item. For example, in some scenarios, the first item comprises a piece of merchandise, while the second item comprises a part of infrastructure (e.g., a shelf of display equipment, a box, a wall, etc.). In other scenarios, the first item comprises the infrastructure, and the second item comprises the merchandise. In yet other scenarios, the first item comprises a support plate of a user interface component (e.g., a push button) and the second item comprises at least one resilient member of the user interface component (or vice versa), as evident from the following discussion in relation to FIGS. 8-10. In still other scenarios, the first item comprises a stationary part of a user interface component (e.g., a rotary knob) and the second item comprises a rotatable part of the user interface component (or vice versa), as evident from the following discussion in relation to FIGS. 19-20. The present solution is not limited to the particulars of this example.

Notably, the RFID tag 102 communicates at a frequency spectrum that does not allow the tag reader 106 to detect the signal when it is in proximity of (e.g., within 0-1 mm) or in contact with the antenna modulation marker 104. This is shown in FIG. 1 where the RFID tag 102 either (1) rejects the interrogation signal 108 since it is outside of the tag's receive operational frequency range or (2) transmits an RF signal (not shown) in response to the interrogation signal 108 but the signal is not detected by the tag reader 106, when the RFID tag 102 is a relatively small distance 108 from, or perhaps even in physical contact with, the antenna modulation marker 104.

However, the RFID tag 102 communicates at a frequency spectrum that allows the tag reader 106 to detect the signal when the tag is not in proximity (e.g., not within 0-1 mm) of the antenna modulation marker 104. This is shown in FIG. 2 where the RFID tag 102 transmits an RF signal 204 that is received by the tag reader 106 since the RFID tag 102 is a larger distance 202 from the antenna modulation marker 104.

Therefore, the behavior of the RFID tag 102 may be modulated when the tag in proximity with the tag modulation marker 104. More specifically, the tag modulation marker actually causes the RFID tag to change its absorption and transmission signal spectrum when in proximity thereto. When the tag modulation marker is in proximity to the RFID tag, it effectively becomes part of the RFID tag's antenna so that the RFID tag's antenna emits a signal at a different frequency spectrum that does not allow the tag reader 106 to detect the signal. Notably, the frequency spectrum is a function of signal frequency versus signal amplitude. The antenna modulation marker 104 may modulate the communications behavior of the RFID tag 102, for example, by changing the tag's resonant frequency, enhancing an RFID signal's amplitude, shifting a phase of the RFID signal, and/or changing a polarization of a backscatter signal.

Referring now to FIGS. 3-4, there are provided illustrations of an illustrative architecture for the antenna modulation marker 104. The antenna modulation marker 104 comprises a substrate 302 with a plurality of conductive traces 304 disposed thereon. The substrate is formed of a dielectric material, such as plastics (e.g., PET, PEN, polyimide), paper or cardboard, fabrics, and/or glass with properties selected to affect the resonant frequency, impedance, gain, bandwidth, and/or radiation pattern of a tag antenna. These properties include, but are not limited to, a material type, a shape, a thickness (e.g., 1.0-5.0 mm) and a permittivity (e.g., dielectric constant 4.3). The antenna modulation marker 104 can have any shape selected in accordance with a particular application. For example, the antenna modulation marker 104 can be rectangular as shown, square, planar, and/or circular. The size of the antenna modulation marker 104 is sufficiently large so that it can provide substantial overlap with the tag antenna when they are in proximity of and aligned with each other. In some scenarios, the antenna modulation marker 104 has a dielectric constant of 3-10. In a particular example, the antenna modulation marker 104 is a PET sheet with a dielectric constant of ~3 and having a thickness of 0.05-0.2 mm. The present solution is not limited in this regard.

Figure 23:
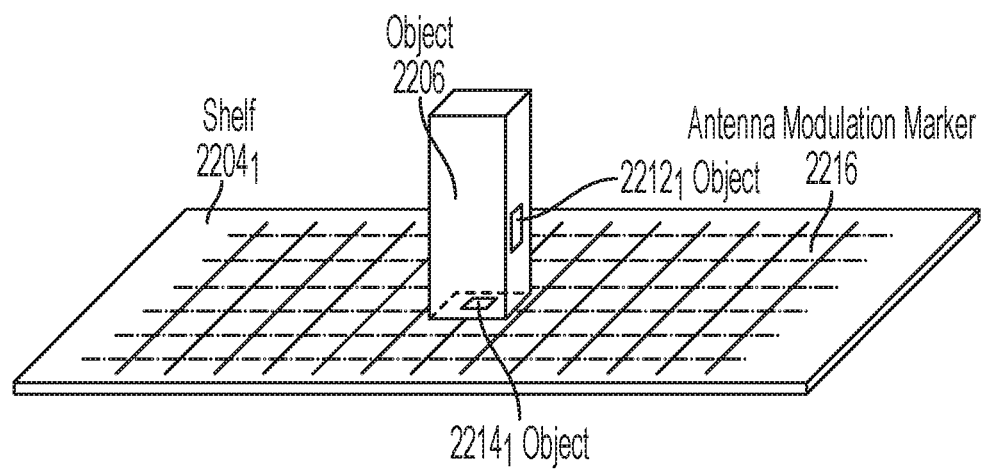

The conductive traces are disposed on the substrate 302 via an inkjet printing process or other deposition technique such as screen printing, gravure printing, aerosol jetting, and/or imprinting techniques. The conductive traces are formed of a conductive material, such as silver. In some scenarios, the conductive traces 304 are linear lines with elongate lengths 400 and widths 402 (e.g., 1 um-5 mm). The dimensions 400, 402 are selected such that the trace array covers an antenna of an RFID tag 102. The conductive traces 304 extend parallel to each other and are equally spaced apart from each other. The spacing between adjacent conductive traces is selected in accordance with a given application. The present solution is not limited to the linear line shapes and/or spacing shown in FIG. 4 for the conductive traces. For example, in other scenarios, the conductive traces comprise a plurality of concentric rings, a plurality of serpentine lines, a plurality of traces forming a grid pattern (e.g., as shown in FIG. 23), or a plurality of traces forming an overlapping pattern.

Five (5) conductive traces are shown in FIG. 4. The present solution is not limited in this regard. The antenna modulation marker 104 can include any number of conductive traces in accordance with the given application (e.g., 1-N conductive traces).

Referring now to FIG. 5, there is an illustration of an illustrative architecture for the RFID tag 102. The RFID tag 102 is shown as comprising a passive tag. The present solution is not limited in this regard. In other scenarios, the RFID tag 102 comprises an active tag. Accordingly, RFID tag 102 can include more or less components than that shown in FIG. 5. However, the components shown are sufficient to disclose an illustrative embodiment implementing the present solution. Some or all of the components of the RFID tag 102 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The RFID tag 102 is configured for allowing data to be exchanged with an external device (e.g., tag reader 106 of FIG. 1) via wireless communication technology. The wireless communication technology can include, but is not limited to, RFID technology. RFID technology is well known in the art, and therefore will not be described in detail herein. Any known or to be known RFID technology can be used herein without limitation.

In general, a passive RFID tag 102 is comprised of three parts: antenna 502 for receiving and transmitting information; an optional RFID Integrated Circuit ("IC") chip 504 for storing and processing information; and a substrate 506. RFID IC chips are well known in the art, and therefore will not be described herein. Any known or to be known RFID IC chip can be used herein without limitation. The IC chip 504 controls communication to/from the RFID tag 102, and facilitates energy harvesting for the passive RFID tag 102. In this regard, it should be noted that the RFID tag 102 does not have an internal power supply. This RFID system relies on the exchange of power and information between the tag reader 106 and the tag 102. The tag reader provides power and communicates with the tag over an RF link. The tag communicates back to the tag reader with data by backscattering a signal from the tag reader.

As shown in FIG. 5, the IC chip 504 is coupled to at least one antenna 502 for allowing data to be exchanged with the external device via a wireless communication technology (e.g., an RFID technology). The antenna 502 is configured to receive signals from the external device and/or transmit signals generated by the IC chip 504. The performance of the antenna is mainly determined by the geometry design and the conductivity of the antenna, as well as the geometric and dielectric properties of the substrate 506. In some scenarios, the antenna is a meander dipole path antenna made by printing techniques, such as inkjet, extrusion or screen printing. The antenna can also be made by stamping or laser cutting metal foil. The substrate can be selected from, but not limited to, polymer, PVC, Polyethylenetherephtalate ("PET"), phenolics, polyesters, styrene, paper, and PCB. The geometric size and shape of the antenna, the conductance and substrate properties (e.g., thickness and dielectric constant) are designed such that the antenna can provide a signal spectrum which can be detected in a tag reader's operation frequency range.

The antenna 502 is designed to: facilitate communications at a frequency spectrum that does not allow a tag reader to detect signals when the antenna is in proximity (e.g., within 0-10 mm) of an antenna modulation marker; and facilitate communications at a frequency spectrum that allows a tag reader to detect signals when the antenna is not in proximity (e.g., not within 0-10 mm) of the antenna modulation marker. Therefore, the behavior of the tag 102 may be modulated when in proximity with an antenna modulation marker. The antenna modulation marker may modulate the behavior of the RFID tag 102, for example, by changing the tag's resonant frequency, attenuating an RFID signal's amplitude, shifting a phase of the RFID signal, and/or changing a polarization of a backscatter signal.

During operation, the IC chip 504 processes received signals (e.g., RF signals) transmitted from external devices to determine whether it should transmit a response signal (e.g., RF carrier signal) to external devices or provide a backscatter response to the external device. In this way, the IC chip 504 can optionally facilitate the locating and/or tracking of an item as described below in relation to FIGS. 22-27.

Various information can be included in the response signal. This information includes, but is not limited to, item level information and/or a unique ID. This information is stored in memory of the IC chip 504. A timestamp may also be included in the response signal. The item level information includes, but is not limited to, an item description, an item price, and/or a currency symbol.

Figure 6:
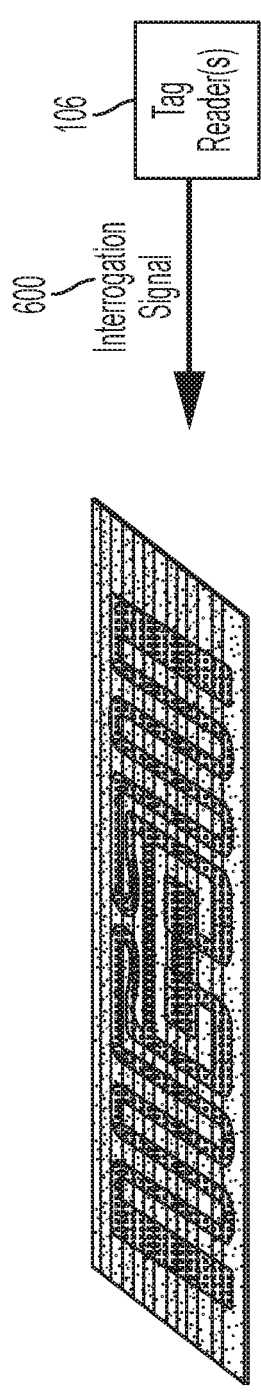
FIGS. 6-7 provide illustrations that are useful for understanding operations of the tag system shown in FIGS. 1-5.
Figure 7:
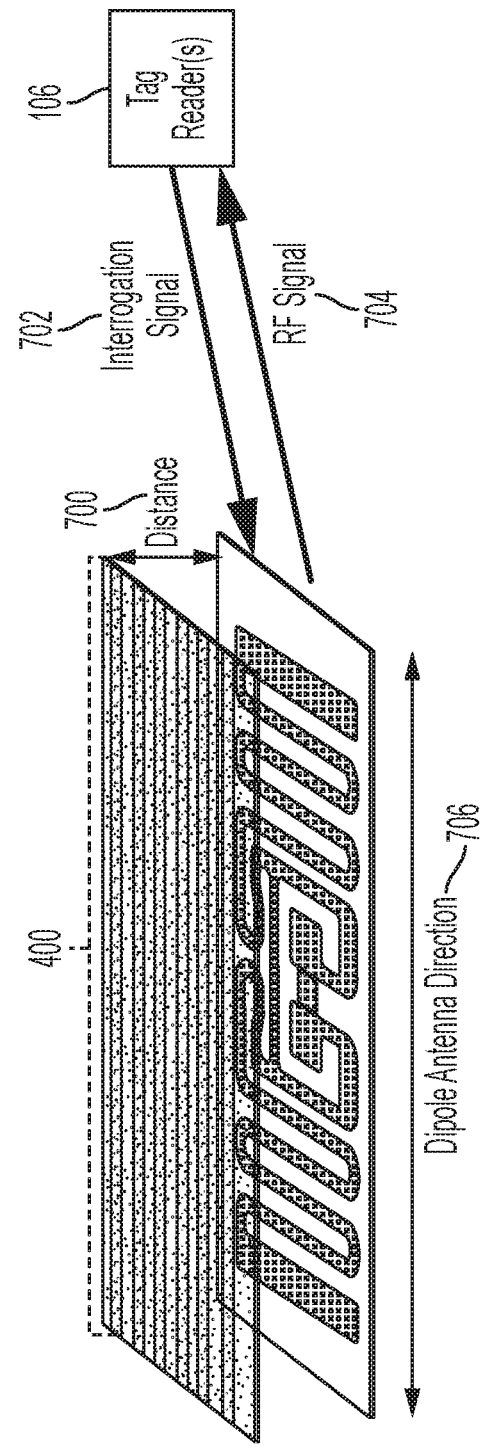

Referring now to FIGS. 6-7, there are provided illustrations that are useful for understanding how a tag system with the antenna modulation marker and RFID architectures of FIGS. 2-5 interact with a tag reader 106. When the antenna modulation marker 104 is placed in proximity to the RFID tag 102 and oriented such that elongate lengths 400 of the conductive traces 304 extend in a direction that is substantially parallel to a dipole antenna direction 706 of the RFID tag's antenna, the RF signal emitted by the RFID tag 102 either (1) rejects the interrogation signal 600 since it is outside of the tag's operational frequency range or (2) transmits an RF signal in response to the interrogation signal 600 but the signal is not detected by the tag reader 106. In contrast, when the antenna modulation marker 104 is oriented such that the elongate lengths 400 of the conductive traces 304 extend in a direction that is not substantially parallel to the dipole antenna direction 706 of the RFID tag's antenna, then the RFID tag 102 communicates at a frequency spectrum that allows the tag reader 106 to be able to detect the signal. This is shown in FIG. 7 where the RFID tag 102 transmits an RF signal 704 (in response to an interrogation signal 702) that is received by the tag reader 106. In this discussion, the term "substantially parallel" can mean an orientation that is up to +/−30 degrees from the parallel direction (such as +/−5 degrees from parallel, +/−10 degrees from parallel, +/−15 degrees from parallel, +/−20 degrees from parallel, +/−25 degrees from parallel, or +/−30 degrees from parallel). Notably, the tag modulator 104 can reside on either side (front or back side) of the RFID tag 102.

Figure 8:
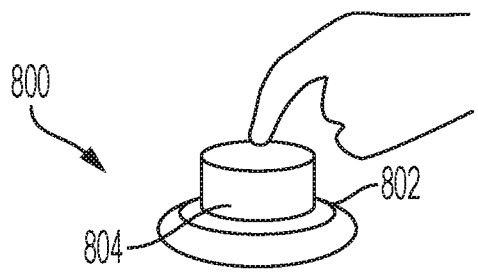
FIGS. 8-10 provide illustrations that are useful for understanding how the tag system of FIGS. 1-7 can be used in push button applications.
Figure 9:
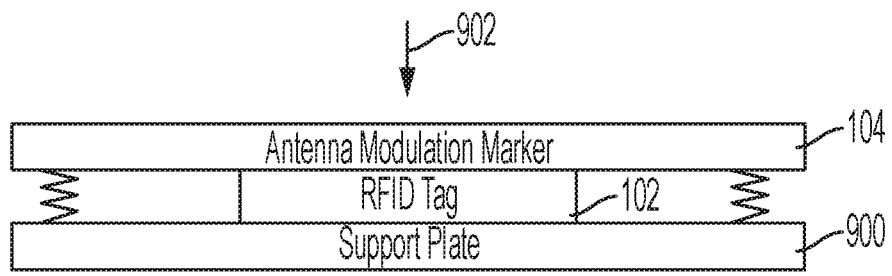
Figure 10:
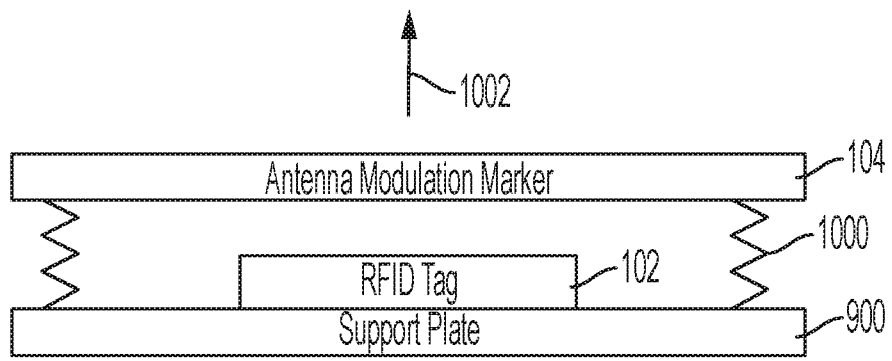

The above described tag system 100 can be used in wireless user input applications. As such, FIGS. 8-10 are provided to assist a reader in understanding one such wireless user input device 800 implementing the tag system 100. In some scenarios, the wireless user input device 800 comprises a wearable push button device configured to instruct another device for certain actions (e.g., turning on/off a radio, answering a phone, inquiring about certain information on a large display nearby, etc.). In other scenarios, the wireless user input device 800 comprises a push button mounted on a panel or wheel of a car for user input to the car's instruments. The present solution is not limited to the particulars of these scenarios.

As shown in FIG. 8, the push button 800 can generally have a form similar to or the same as a conventional push button. The tag system 100 is disposed inside the push button housing 802 such that the distance between the RFID tag 102 and antenna modulation marker 104 can be selectively changed via depressions of the button 804. More specifically, the antenna modulation marker 104 can be moved in a direction 902 towards the RFID tag 102 via the user's depression of the button 804 and in a direction 1002 away from the RFID tag 102 via the user's release of the button after depression (or vice versa). In this regard, the RFID tag 102 is disposed directly on a support plate 900, and the antenna modulation marker 104 is coupled to the support plate 900 via resilient members 1000 (e.g., springs which are normally in an uncompressed state). The present solution is not limited in this regard. Alternatively, the antenna modulation marker 104 is disposed directly on a support plate 900, and the RFID tag 102 is coupled to the support plate 900 via resilient members 1000 (e.g., springs which are normally in an uncompressed state).

Figure 11:
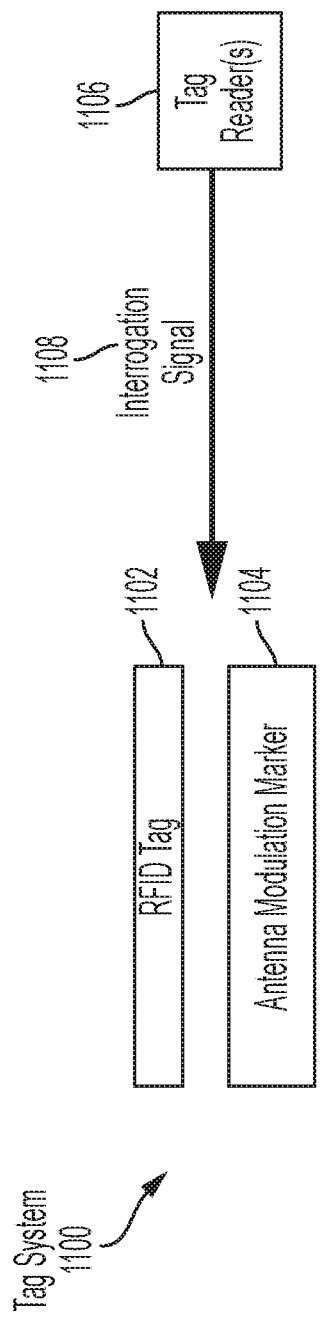
FIGS. 11-12 provide illustrations that are useful for understanding the present solution.
Figure 12:
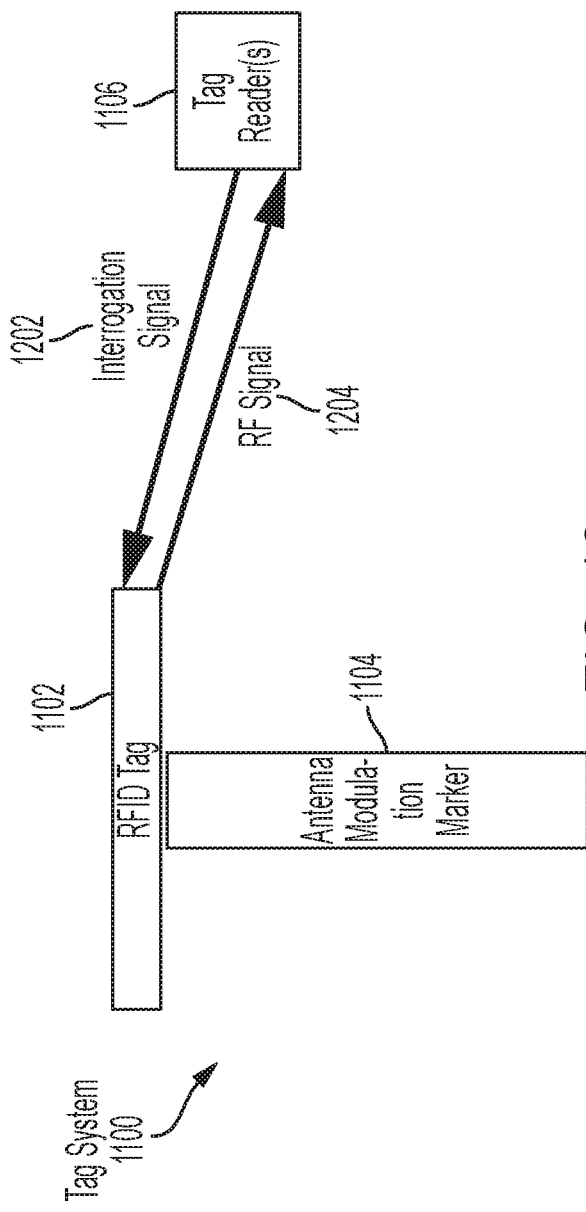

Referring now to FIGS. 11-12, there are provided schematic illustrations that are useful for understanding another tag system 1100 in accordance with the present solution. The novel tag system 1100 comprises a least one RFID tag 1102 and at least one antenna modulation marker 1104 which are always in proximity to each other. The antenna modulation marker 1104 generally comprises a passive structure having physical and material properties that affect communication characteristics of a tag antenna whereby the output signal from the tag is modified based on the passive structure's orientation relative to the RFID tag.

RFID tag 1102 is designed to communicate at a frequency spectrum that does not allow a tag reader 1106 to detect the signal when the tag modulator 1104 has a first orientation relative to the RFID tag. This is shown in FIG. 11 where the RFID tag 1102 either (1) rejects the interrogation signal 1108 since it is outside of the tag's operational frequency range as modified by the tag modulation marker or (2) transmits an RF signal (not shown) in response to the interrogation signal 1108 but the signal is not detected by the tag reader 1106.

The RFID tag 1102 is also designed to communicate at a frequency spectrum that allows the tag reader 1106 to detect the signal when the antenna modulation marker 1104 has a second different orientation relative to the RFID tag. This is shown in FIG. 12 where the RFID tag 1102 transmits an RF signal 1204 (in response to the interrogation signal 1202) that is received by the tag reader 1106 since the antenna modulation marker 1104 has the second different orientation relative to the RFID tag.

Therefore, the behavior of the RFID tag 1102 is modulated by the antenna modulation marker 1104 when the marker is oriented in a direction that is substantially parallel to the dipole direction of the antenna of the RFID tag. More specifically, when so oriented the antenna modulation marker is effectively part of the RFID tag's antenna so that the RFID tag's antenna emits a signal at different frequency spectrums based on the antenna modulation marker's relative orientation thereto. The antenna modulation marker 1104 may modulate the communications behavior of the RFID tag 1102, for example, by changing the tag's resonant frequency, enhancing an RFID signal's amplitude, shifting a phase of the RFID signal, and/or changing a polarization of a backscatter signal.

Referring now to FIG. 13, there is provided a side view of an illustrative architecture for the tag system 1100. As shown in FIG. 13, the RFID tag 1102 is disposed on a substrate 1302 (e.g., a plastic plate). The antenna modulation marker 1104 is disposed on the RFID tag 1102. The antenna modulation marker 1104 comprises a plurality of conductive traces 1400 disposed on a substrate 1402, as shown in FIG. 14. The substrate 1402 is formed of a dielectric material, such as plastics (e.g., PET, PEN, polyimide), paper or cardboard, fabrics, and/or glass with properties selected to affect the resonant frequency, impedance, gain, bandwidth, and/or radiation pattern of an RFID tag antenna. These properties include, but are not limited to, a material type, a shape, a thickness (e.g., 0.05-5.0 mm) and a permittivity (e.g., dielectric constant 2-40). The antenna modulation marker 1104 can have any shape selected in accordance with a particular application. For example, the antenna modulation marker 1104 can be rectangular as shown, square, planar, and/or circular. The size of the antenna modulation marker 1104 is sufficiently large so that it can provide substantial overlap with the tag antenna when they are in proximity of and aligned with each other. In some scenarios, the antenna modulation marker 1104 has a dielectric constant of 3-10. In a particular example, the antenna modulation marker 1104 substrate is a PEN sheet with a dielectric constant of ~3 and having a thickness of 0.05-0.2 mm. The present solution is not limited in this regard.

Figure 16A:
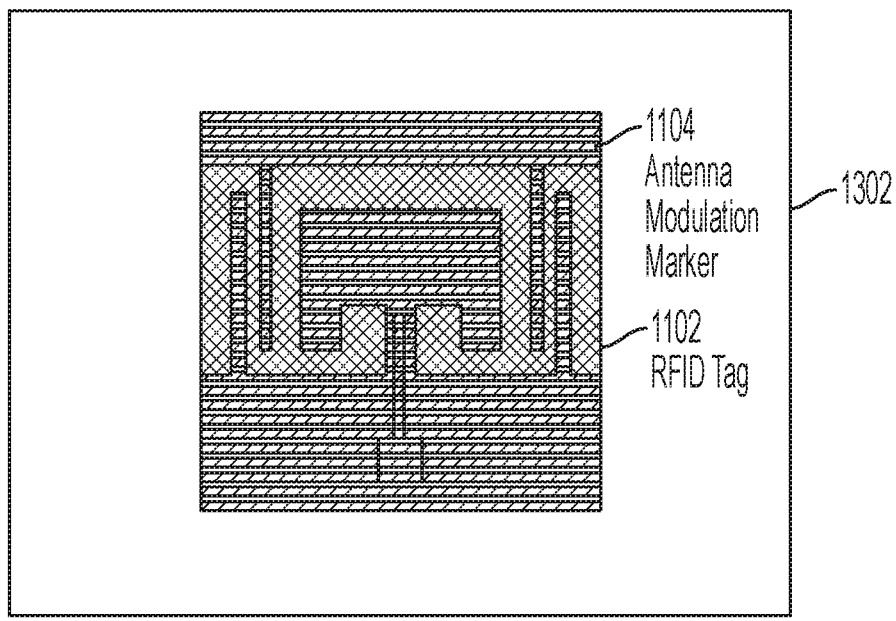
FIGS. 16A-16C (collectively referred to herein as "FIG. 16") provide illustrations that are useful for understanding how the tag system shown in FIGS. 11-15 operates.
Figure 16B:
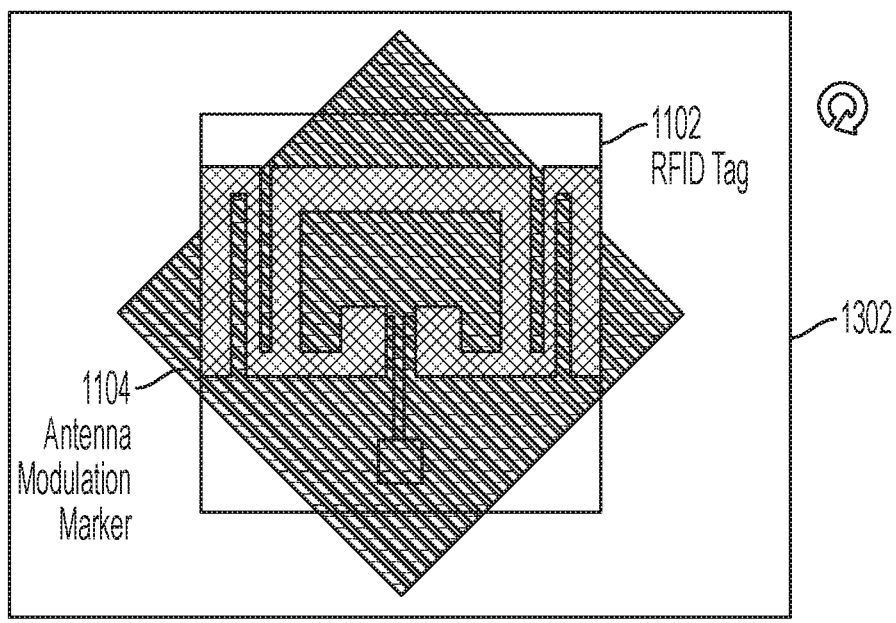
Figure 16C:
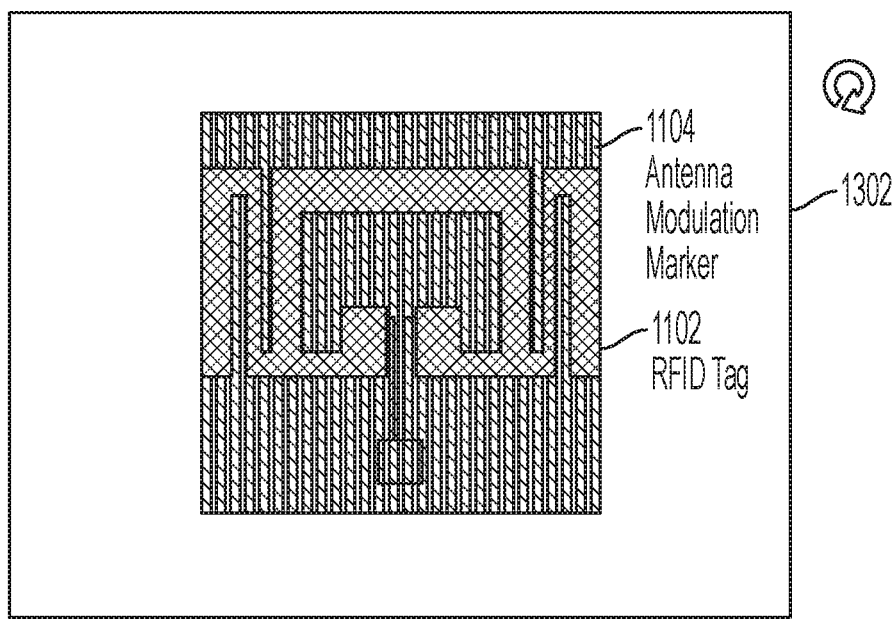

In some scenarios, the conductive traces are linear lines with elongate lengths 1404 which extend in a first direction 1406 relative to an elongate sidewall 1408 of the substrate 1302. The present solution is not limited to the linear line shape of the conductive traces shown in FIG. 14. Alternatively, the conductive traces comprises serpentine lines, a plurality of traces forming a grid pattern (e.g., as shown in FIG. 23), or a plurality of traces forming an overlapping pattern. The orientation of the conductive traces 1400 relative to the elongate sidewall 1408 is modifiable or changeable as shown in FIGS. 16A-16C (e.g., via rotation of the antenna modulation marker 1104 relative to the RFID tag 1102 and substrate 1302 in a clockwise direction and/or counterclockwise direction).

Figure 15:
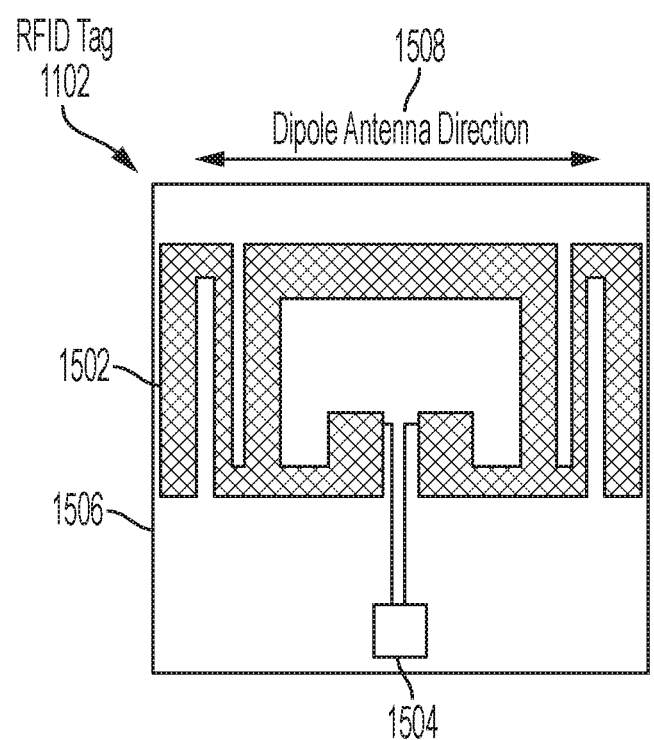
FIG. 15 provides an illustration of an illustrative architecture for the RFID tag shown in FIGS. 11-14.

A more detailed illustration of the RFID tag 1102 is provided in FIG. 15. The RFID tag 1102 is shown as comprising a passive tag. The present solution is not limited in this regard. In other scenarios, the RFID tag 1102 comprises an active tag. Accordingly, RFID tag 1102 can include more or less components than that shown in FIG. 15. However, the components shown are sufficient to disclose an illustrative embodiment implementing the present solution. Some or all of the components of the RFID tag 1102 can be implemented in hardware, software and/or a combination of hardware and software. The hardware includes, but is not limited to, one or more electronic circuits. The electronic circuit(s) may comprise passive components (e.g., capacitors and resistors) and/or active components (e.g., processors) arranged and/or programmed to implement the methods disclosed herein.

The RFID tag 1102 is configured for allowing data to be exchanged with an external device (e.g., tag reader 1106 of FIGS. 11-12) via wireless communication technology. The wireless communication technology can include, but is not limited to, RFID technology. RFID technology is well known in the art, and therefore will not be described in detail herein. Any known or to be known RFID technology can be used herein without limitation.

In general, a passive RFID tag 1102 is comprised of three parts: antenna 1502 for receiving and transmitting information; an optional RFID Integrated Circuit ("IC") chip 1504 for storing and processing information; and a substrate 1506. RFID IC chips are well known in the art, and therefore will not be described herein. Any known or to be known RFID IC chip can be used herein without limitation. The IC chip 1504 controls communication to/from the RFID tag 1102, and facilitates energy harvesting for the passive RFID tag 1102. In this regard, it should be noted that the RFID tag 1102 does not have an internal power supply. This RFID system relies on the exchange of power and information between the tag reader 1106 and the tag 1102. The tag reader provides power and communicates with the tag over an RF link. The tag communicates back to the tag reader with data by backscattering a signal from the tag reader.

As shown in FIG. 15, the IC chip 1504 is coupled to at least one antenna 1502 for allowing data to be exchanged with the external device via a wireless communication technology (e.g., an RFID technology). The antenna 1502 is configured to receive signals from the external device and/or transmit signals generated by the IC chip 1504. The performance of the antenna is mainly determined by the geometry design and the conductivity of the antenna, as well as the geometric and dielectric properties of the substrate 1506. In some scenarios, the antenna is a meander dipole path antenna made by printing techniques, such as inkjet, extrusion or screen printing. The antenna can also be made by stamping or laser cutting metal foil. The substrate can be selected from but not limited to polymer, PVC, Polyethylenetherephtalate ("PET"), phenolics, polyesters, styrene, paper, and PCB. The geometric size and shape of the antenna, the conductance and substrate properties (e.g., thickness and dielectric constant) are designed such that the antenna can provide a signal spectrum which can be detected in a tag reader's operation frequency range.

The antenna 1502 is designed to: facilitate communications at a frequency spectrum that does not allow a tag reader to detect signals when the conductive traces 1400 of an antenna modulation marker extend parallel to a dipole direction 1508 of the antenna 1502; and facilitate communications at a frequency spectrum that allows a tag reader to detect signals when the conductive traces 1400 of an antenna modulation marker extend perpendicular to or are otherwise angled relative to the dipole antenna direction 1508. Therefore, the behavior of the tag 1102 may be modulated based on the relative orientation of the antenna modulation marker 1104. The antenna modulation marker may modulate the behavior of the RFID tag 1102, for example, by changing the tag's resonant frequency, attenuating an RFID signal's amplitude, shifting a phase of the RFID signal, and/or changing a polarization of a backscatter signal.

During operation, the IC chip 1504 processes received signals (e.g., RF signals) transmitted from external devices to determine whether it should transmit a response signal (e.g., RF carrier signal) to external devices or provide a backscatter response to the external device. In this way, the IC chip 1504 may facilitate the registration, identification, location and/or tracking of an item to which the tag 102 is coupled. Various information can be included in the response signal. This information includes, but is not limited to, item level information and a unique ID. This information is stored in memory of the IC chip 1504. A timestamp may also be included in the response signal. The item level information includes, but is not limited to, an item description, an item price, and/or a currency symbol.

Referring now to FIGS. 17-18, there are provided illustrations that are useful for understanding how a tag system with the antenna modulation marker and RFID architectures of FIGS. 11-16 interact with a tag reader 1106. When the antenna modulation marker 1104 is placed in a first orientation relative to the RFID tag 1102 such that elongate lengths 1404 of the conductive traces 1400 extend parallel to a dipole antenna direction 1508 as shown in FIG. 16A, the RFID tag 1102 either (1) rejects the interrogation signal 1700 since it is outside of the tag's receive operational frequency range or (2) transmits an RF signal (not shown) in response to the interrogation signal 1700 but the signal is not detected by the tag reader 1106. In contrast, when the antenna modulation marker 104 is placed a second orientation relative to the RFID tag 1102 such that elongate lengths 1404 of the conductive traces 1400 extend perpendicular to (as shown in FIG. 16C) or are otherwise angled relative to the dipole antenna direction 1508 (as shown in FIG. 16B), the RFID tag 1102 communicates at a frequency spectrum that allows a tag reader 1106 to detect a signal. This is shown in FIG. 18 where the RFID tag 1102 transmits an RF signal 1804 (in response to an interrogation signal 1802) that is received by the tag reader 1106.

Figure 19:
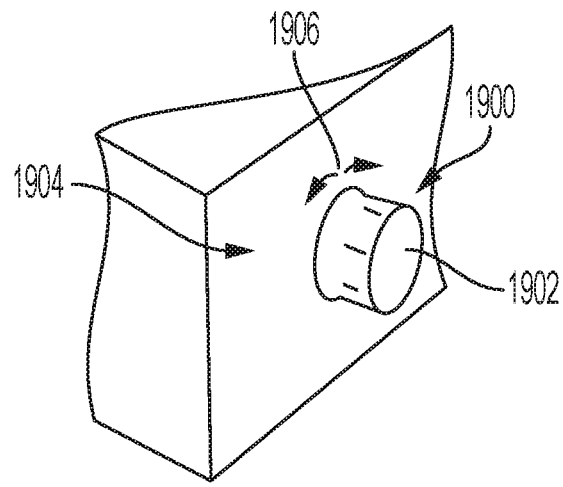
FIGS. 19-20 provide illustrations that are useful for understanding how the tag system of FIGS. 11-18 can be used in rotatable button applications.
Figure 20:
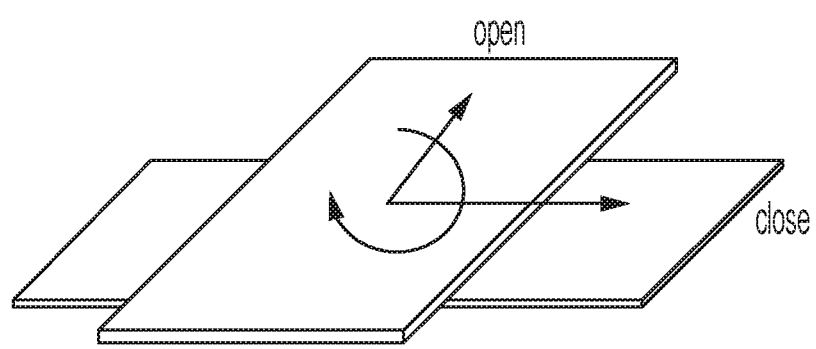

The above described tag system 1100 can be used in wireless user input applications. As such, FIGS. 19-20 are provided to assist a reader in understanding one such wireless user input device 1900 implementing the tag system 1100. In some scenarios, the wireless user input device 1900 comprises a rotary knob configured to instruct another device for certain actions (e.g., turning on/off a radio, answering a phone, inquiring about certain information on a large display nearby, etc.). In other scenarios, the wireless user input device 1900 comprises a rotary knob mounted on a panel or wheel of a car for user input to the car's instruments. The present solution is not limited to the particulars of these scenarios.

As shown in FIG. 19, the rotary knob 1900 can generally have a form similar to or the same as a conventional rotary knob. The tag system 1100 is disposed inside the rotary knob housing 1902 such that the orientation of the antenna modulation marker 1104 can be selectively changed via a user's rotation of a button 1904. More specifically, the antenna modulation marker 1104 can be rotated in clockwise and/or counter clockwise directions 1906 by a user. The present solution is not limited in this regard. Alternatively, the tag system 1100 is disposed inside the rotary knob housing 1902 such that the orientation of the RFID tag 1102 can be selectively changed via a user's rotation of a button 1904.

Figure 21:
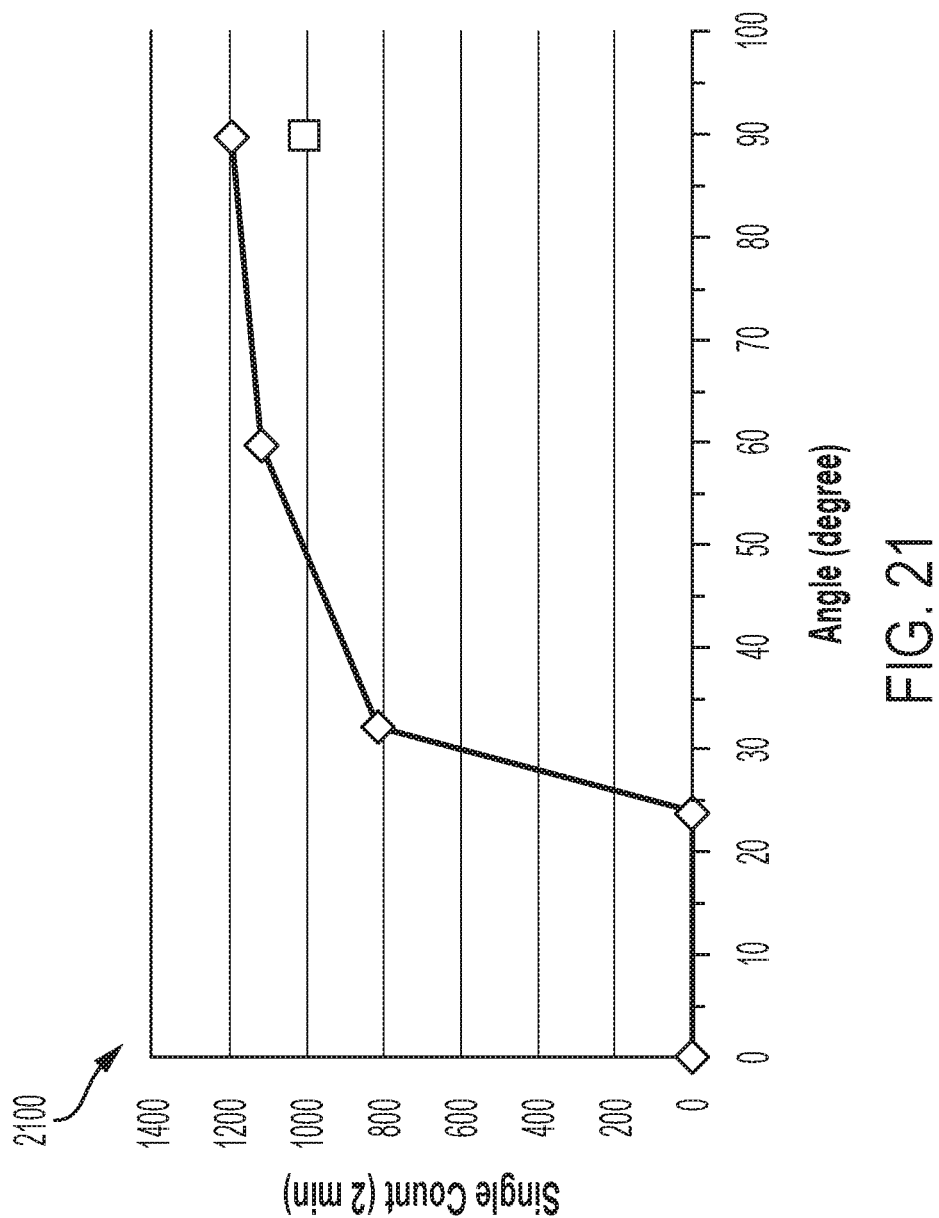
FIG. 21 provides a graph.

Referring now to FIG. 21, there is provided a graph 2100 plotting experimental signal counts as a function of the angle between the conductive traces 1400 and the dipole direction 1508. When conductive traces 1400 of the antenna modulation marker 1104 extend substantially parallel to the dipole direction 1508 of the RFID tag 1102 (e.g., as shown in FIG. 16A), the read signal count within two minutes is zero. When the angle is larger than thirty degrees (e.g., as shown in FIG. 16B), the tag reader 1106 begins receiving the signal output from the RFID tag 1102. When the angle approaches ninety degrees (e.g., as shown in FIG. 16C), the signal count is similar to that without the antenna modulation marker. This data indicates the antenna on/off behavior when the orientation of the antenna modulation marker changes. In this case, the tag system is enabled when the conductive traces are angled at least thirty degrees relative to the dipole antenna direction. The single data point (red square) at 90 degrees is the signal counts without the antenna modulation marker.

Illustrative Inventorying System

The above described tag systems 100, 1100 can be used in a variety of applications. For example, the tag systems 100, 1100 can be used in retail store applications. Accordingly, an illustrative retail store application of the present solution will now be described in relation to FIGS. 22-24.

Figure 22:
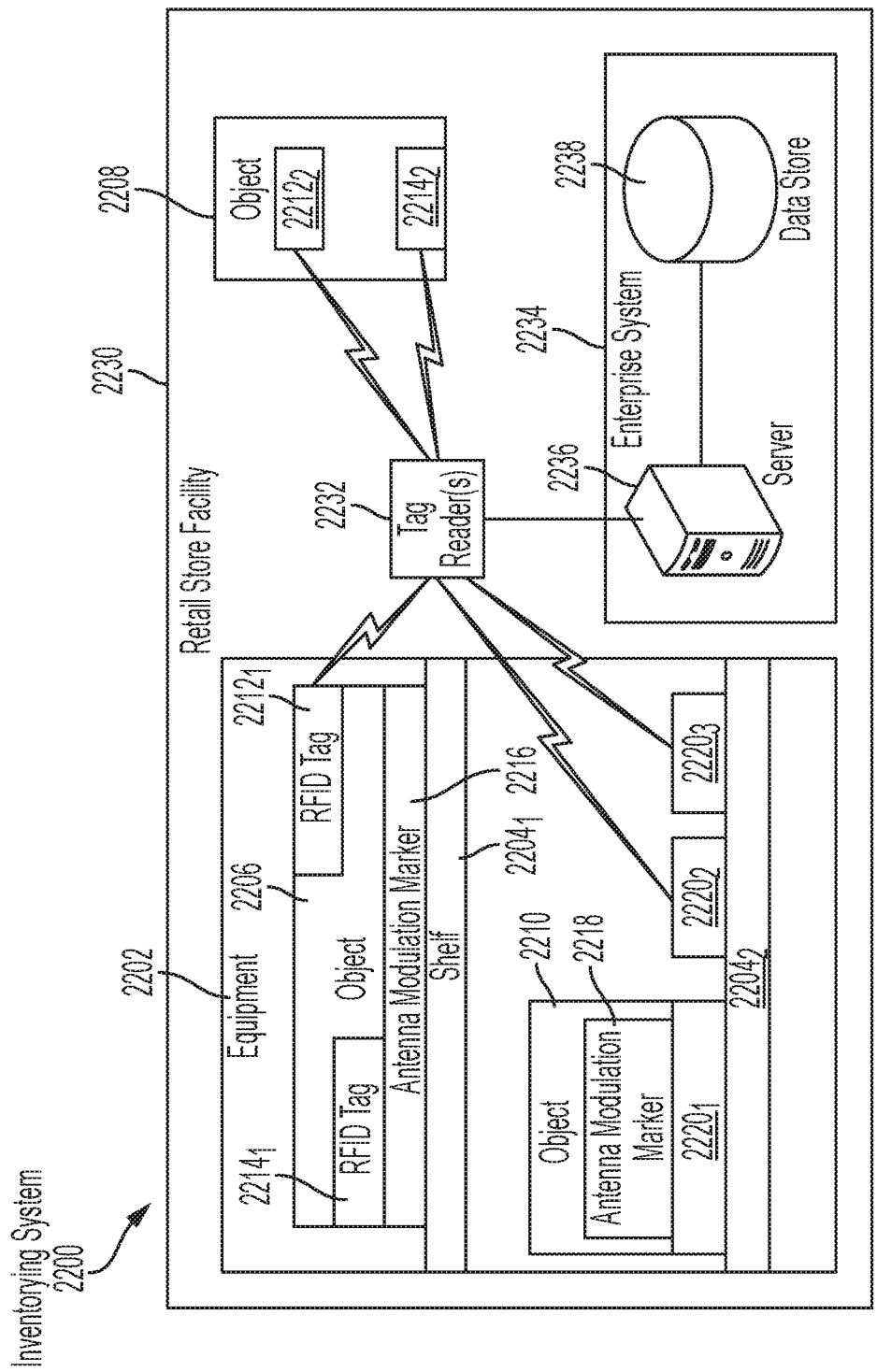
FIGS. 22-24 provides illustrations of an illustrative inventorying system in which the present solution can be employed.

Referring now to FIG. 22, there is provided a schematic illustration of an illustrative inventorying system 2200 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The inventorying system 2200 is generally configured to allow improved inventory counts of objects and/or items located within a facility. As shown in FIG. 22, inventorying system 2200 comprises a Retail Store Facility ("RSF") 2230 in which equipment 2202 is disposed. The equipment is provided for displaying objects (or items) 2206, 2208, 2210 to customers of the retail store and/or for holding the objects (or items) during a purchase transaction and/or a return transaction. The equipment can include, but is not limited to, shelves $2204_1$-$2204_2$, article display cabinets, promotional displays, fixtures, checkout counters, and/or equipment securing areas of the RSF 2230. The RSF can also include emergency equipment (not shown) and an Electronic Article Surveillance ("EAS") system (not shown). Emergency equipment and EAS systems are well known in the art, and therefore will not be described herein.

One or more tag readers 2232 are provided to assist in counting the objects 2206, 2208, 2210 located within the RSF 2230. Each tag reader 2232 comprises an RFID reader configured to read RFID tags $2212_1$, $2212_2$ (collectively referred to as "2212"), $2214_1$, $2214_2$ (collectively referred to as "2214"), $2220_1$, $2220_2$, $2220_3$ (collectively referred to as "2220"). Tag reader 2232 is strategically placed at a known location within the RSF 2230. For example, the tag reader 2232 is placed in proximity to the equipment 2202 (e.g., at the end of an aisle or at a checkout counter). The present solution is not limited in this regard. The tag reader 2232 can alternatively be a mobile tag reader that is moved into a Zone Of Interest ("ZOI") inside the RSF 2230. The ZOI can include any area in the RSF such as a particular aisle and/or a particular section (e.g., the frozen section, the adult women's dress section, changing rooms, stockroom, garden section, entryway, etc.).

By correlating the tag reader's RFID tag reads and the tag reader's known location within the RSF 2230, it is possible to determine the location of objects 2206, 2208, 2210 within the RSF 2230. The tag reader's known coverage area also facilitates object location determinations. Accordingly, RFID tag read information and tag reader location information is stored in a data store 2238. This information can be stored in the data store 2238 using a server 2236. Server 2236 will be described in more detail below in relation to FIG. 25. The sever 2236 and the data store 2238 are collectively referred to herein as an enterprise system 2234.

During operation, inventorying system 2200 may be used as an object identification and location system. In this regard, RFID tags 2212, 2214 are respectively attached or coupled to the objects 2206, 2208. RFID tags 2220 are coupled to the equipment 2202 so as to create smart equipment (e.g., a smart shelve(s) $2204_2$). The RFID tags are described herein as comprising single-technology tags that are only RFID enabled. The present solution is not limited in this regard. One or more of the RFID tags can alternatively or additionally comprise dual-technology tags that have both EAS and RFID capabilities.

RFID tags 2212, 2214, 2220 can be the same as or substantially similar to RFID tag 102 of FIGS. 1-7. The RFID tags 2212, 2214, 2220 also have unique identifiers assigned thereto such that they can be distinguished from each other. Additionally, each RFID tag comprises an antenna for RF communications. The antenna is designed to emit RF signals at a frequency spectrum that allows the tag reader 2232 to detect the signal within its operating frequency range (e.g., 860-960 MHz). However, when the RFID tag's antenna is in physical contact with an antenna modulation marker 2216, 2218 or within a small threshold distance away from the antenna modulation marker, at least one of the antenna's operating characteristics is affected. Accordingly at the time that the RFID tag is proximate to the antenna modulation marker, the RFID tag is capable of transmitting RFID signals at a different frequency spectrum that does not allow the tag reader 2232 to detect the signals within its operating frequency range (e.g., 2.4 GHz). The antenna modulation markers 2216, 2218 are the same as or substantially similar to antenna modulation marker 104 of FIGS. 1-7.

An antenna modulation marker 2216 is shown in FIGS. 22-23 as being disposed on a structure. For example, the antenna modulation marker 2216 is disposed on a shelf $2204_1$ of equipment 2202. RFID tags $2214_1$, $2214_2$ are disposed on the bottoms of objects 2206, 2208, while RFID tags $2212_1$, $2212_2$ are disposed at locations which are spaced from the object's 2206, 2208 bottom portions. In this way, the inventorying system 2200 is able to make a determination that an object is in an area other than the area covered by the tag reader 2232 when the tag reader 2232 does not receive signals from the RFID tags 2212, 2214 coupled to the object. The inventorying system 2200 is also able to make a determination that an object 2208 is in the area covered by the tag reader 2232 but not on a shelf $2204_1$ when the tag reader 2232 receives signals from both RFID tags $2212_2$, $2214_2$ coupled to the object. The inventorying system 2200 is further able to make a determination that an object 2206 is in the area covered by the tag reader 2232 and on a shelf $2204_1$ when the tag reader 2232 receives a signal from only one of the RFID tags $2212_1$ coupled to the object. The orientation of the object 2206 may additionally be determined using another RFID tag (not shown) disposed on the bottom of the object 2206 so as to have a bipole antenna direction that is different than the bipole antenna direction of the RFID tag $2214_1$. This provides more accurate object locations as compared to that provided in conventional systems in which object locations are determined to be within a much larger area than a shelf of a particular piece of equipment.

Figure 24:
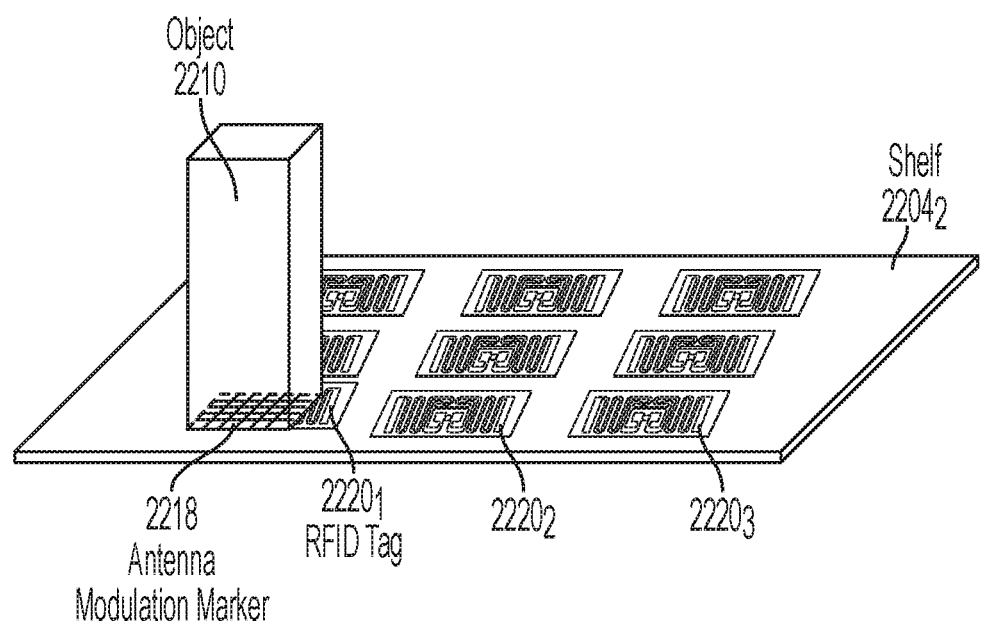

As shown in FIGS. 22 and 24, an array of RFID tags $2220_1$, $2220_2$, $2220_3$ is provided on a shelf $2204_2$. A tag modulator 2218 is disposed on a surface of an object 2210. The tag reader 2232 reads the array of RFID tags. When a signal is not received from one of the RFID tags in the array (e.g., RFID tag $2220_1$), the inventorying system 2200 makes a determination that the object 2210 is in proximity of the particular RFID tag $2220_1$ on the shelf $2204_2$. This also provides a more accurate object location as compared to that provided in conventional systems.

In an alternative embodiment of FIG. 24, the size of the antenna modulation marker 2218 can be much larger than a single antenna tag $2220_1$, so that the marker may cover several adjacent antenna tags. By analyzing the coverage of the tag by the marker, a particular item may be identified on a particular location.

The RF signals communicated from the RFID tags 2212, 2214, 2220 contain the unique identifiers thereof. The tag reader 2232 processes the RF signals to obtain the unique identifiers. The unique identifiers and timestamps are then communicated from the tag reader 2232 to the enterprise system 2234. At the enterprise system, the unique identifiers and timestamps are stored in a data store 2238 for object location and/or inventory purposes. The object locations reflect the area in which each object resides, the structure on which each object is disposed, and/or the part of the structure on which each object is disposed.

Figure 25:
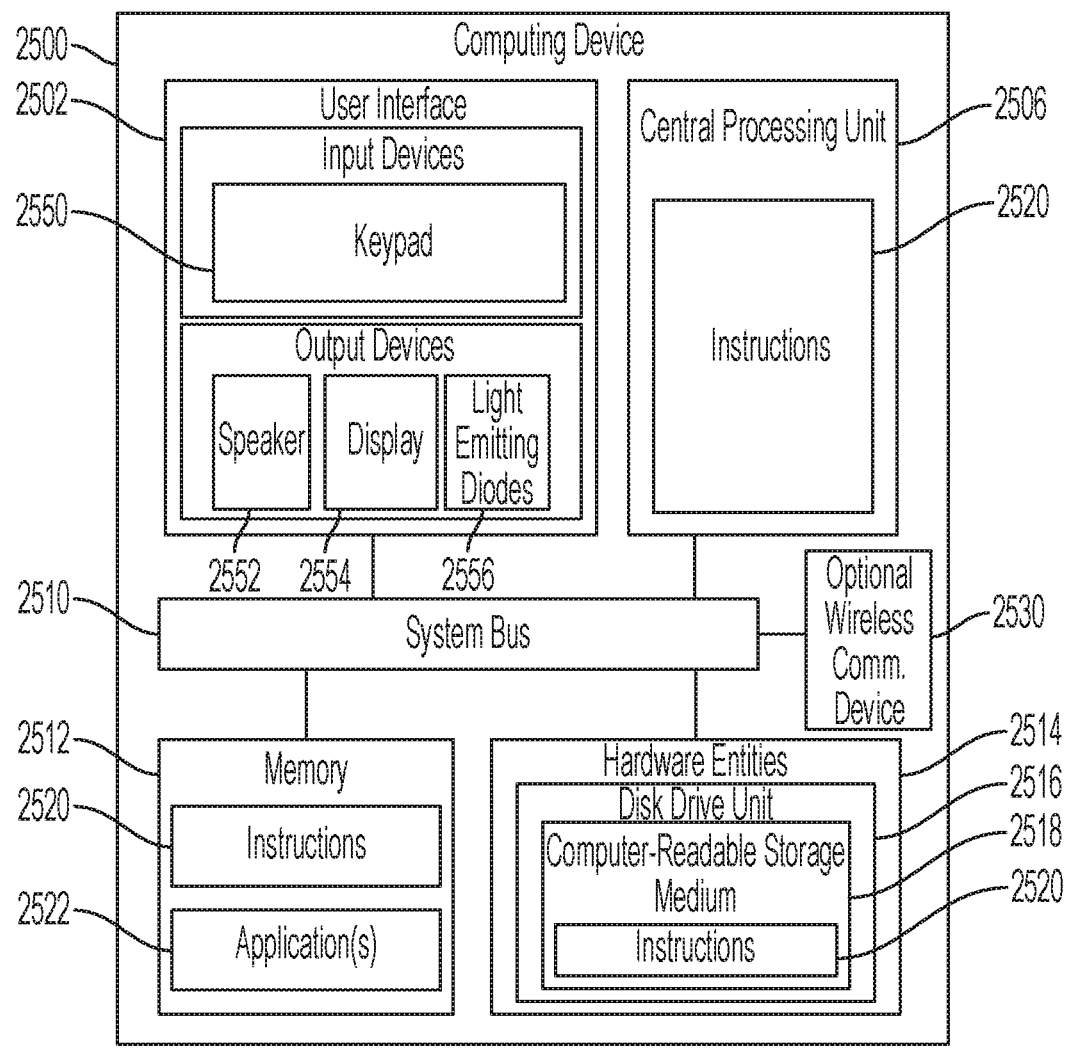
FIG. 25 provides a block diagram of an illustrative computing device.

Referring now to FIG. 25, there is provided a detailed block diagram of an example architecture for a computing device 2500. Tag reader 2232 and/or server 2236 of FIG. 22 may be the same as or substantially similar to computing device 2500. As such, the following discussion of computing device 2500 is sufficient for understanding tag reader 2232 and/or server 2236. Notably, the present solution can operate without use of a server.

Computing device 2500 may include more or less components than those shown in FIG. 25. However, the components shown are sufficient to disclose an illustrative embodiment implementing the present solution. The hardware architecture of FIG. 25 represents one embodiment of a representative computing device configured to facilitate inventory counts and management. As such, the computing device 2500 of FIG. 25 implements at least a portion of a method for determining object locations in accordance with the present solution.

Some or all the components of the computing device 2500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 25, the computing device 2500 comprises a user interface 2502, a CPU 2506, a system bus 2510, a memory 2512 connected to and accessible by other portions of computing device 2500 through system bus 2510, and hardware entities 2514 connected to system bus 2510. The user interface can include input devices (e.g., a keypad 2550) and output devices (e.g., speaker 2552, a display 2554, and/or light emitting diodes 2556), which facilitate user-software interactions for controlling operations of the computing device 2500.

At least some of the hardware entities 2514 perform actions involving access to and use of memory 2512, which can be a RAM, a disk driver and/or a Compact Disc Read Only Memory ("CD-ROM"). Hardware entities 2514 can include a disk drive unit 2516 comprising a computer-readable storage medium 2518 on which is stored one or more sets of instructions 2520 (e.g., software code) configured to implement one or more of the methodologies, procedures, or functions described herein. The instructions 2520 can also reside, completely or at least partially, within the memory 2512 and/or within the CPU 2506 during execution thereof by the computing device 2500. The memory 2512 and the CPU 2506 also can constitute machine-readable media. The term "machine-readable media", as used here, refers to a single medium or multiple media (e.g., a centralized or distributed database, and/or associated caches and servers) that store the one or more sets of instructions 2520. The term "machine-readable media", as used here, also refers to any medium that is capable of storing, encoding or carrying a set of instructions 2520 for execution by the computing device 2500 and that cause the computing device 2500 to perform any one or more of the methodologies of the present disclosure.

In some scenarios, the hardware entities 2514 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 2522 installed on the computing device 2500. The software application 2522 is generally operative to facilitate: the determination of RFID tag locations within a facility; the direction of travel of RFID tags in motion; and the mapping of the RFID tag locations and movements in a virtual three dimensional space. Other functions of the software application 2522 will become apparent as the discussion progresses. Such other functions can relate to tag reader control and/or tag control.

Illustrative Methods for Locating Objects

Figure 26A:
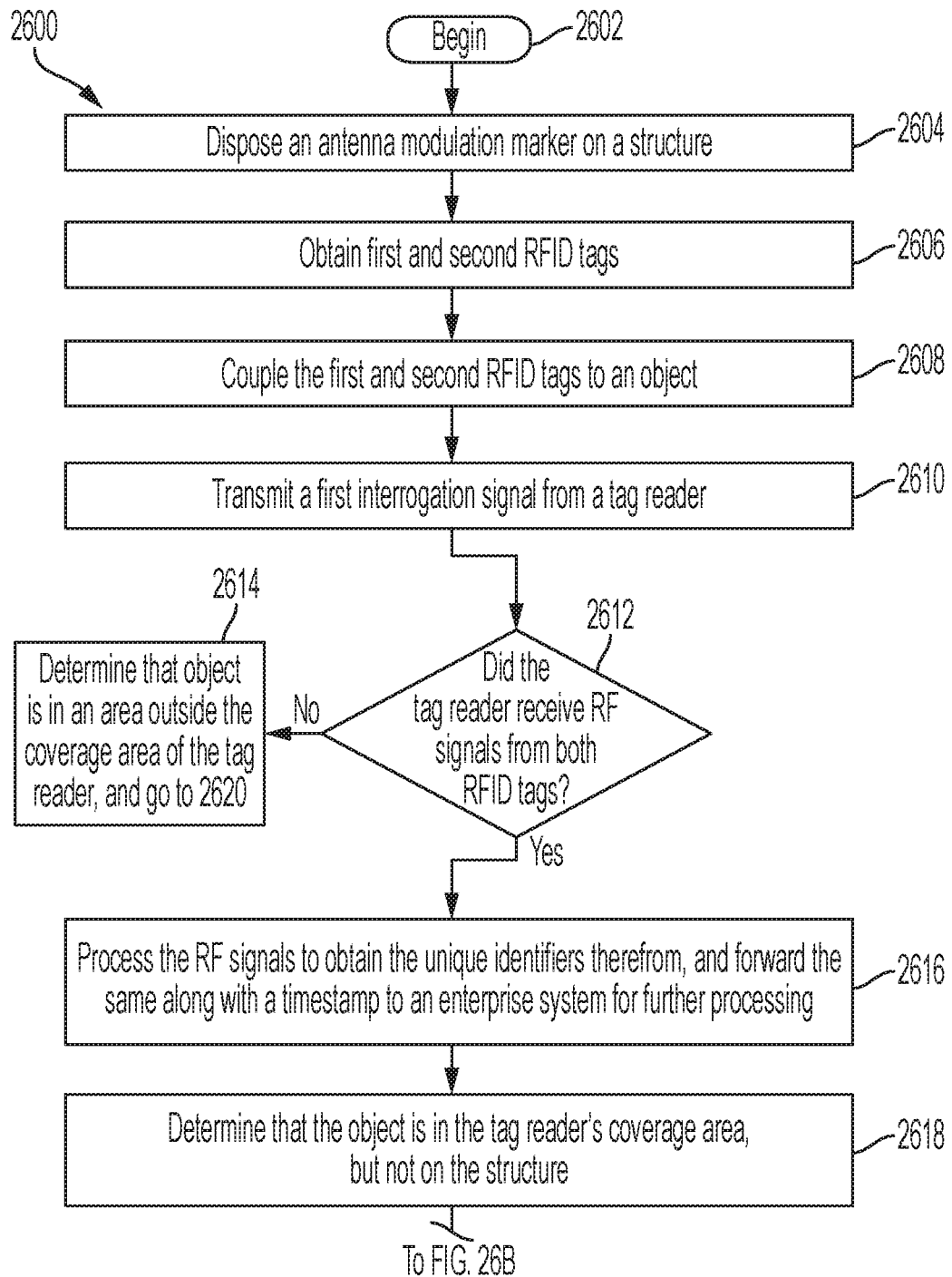
FIGS. 26A-B (collectively referred to as "FIG. 26") provides a flow diagram of an illustrative method for detecting or determining an object's location in a facility.
Figure 26B:
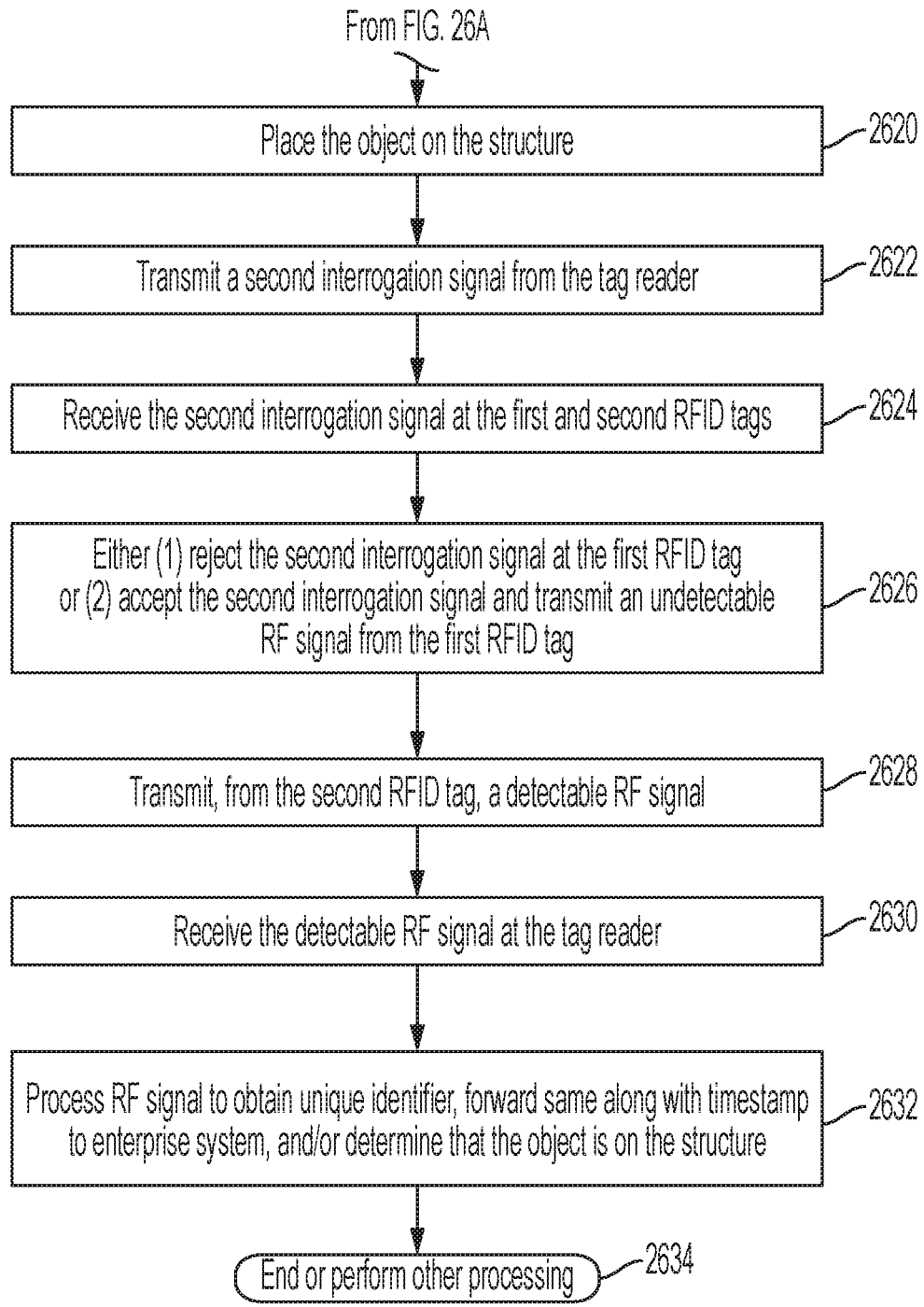

Referring now to FIG. 26, there is provided a flow diagram of an illustrative method 2600 for detecting or determining an object's (e.g., object 2206, 2208 of FIG. 22) location in a facility (e.g., RSF 2230 of FIG. 22). Method 2600 begins with 2602 and continues with 2604 where an antenna modulation marker (e.g., antenna modulation marker 2216 of FIG. 22) is disposed on a structure (e.g., equipment 2202 and/or shelf 2204₁ of FIG. 22). In 2206, first and second RFID tags (e.g., RFID tag 2212₁, 2212₂, 2214₁, 2214₂ of FIG. 22) are obtained. The first RFID tag is the same as or similar to RFID tag 2214₁ or 2214₂ of FIG. 22, while the second RFID tag is the same as or similar to RFID tag 2212₁ or 2214₂ of FIG. 22. The first and second RFID tags are coupled to the object in 2208.

In 2210, a first interrogation signal is transmitted from a tag reader (e.g., tag reader 2232 of FIG. 22). Interrogation signals are well known in the art. Next in 2612, a decision is made as to whether the tag reader received RF signals from both RFID tags. If not [2612:NO], then 2614 is performed where a determination is made that the object is in an area outside the coverage area of the tag reader. Method 2600 then continues to 2620 which will be discussed below.

If the tag reader received RF signals from both RFID tags [2612:YES], then 2616 is performed where the RF signals are processed to obtain the unique identifiers therefrom. The unique identifiers are forwarded along with a timestamp to an enterprise system (e.g., enterprise system 2234 of FIG. 22) for further processing. The unique identifiers are used in 2618 to determine that the object is in the tag reader's coverage area, but not on the structure.

In 2620, the object is placed on the structure. For example, the object is placed on the structure such that the first RFID tag resides in proximity to the antenna modulation marker. Thereafter in 2622, a second interrogation signal is transmitted from the tag reader. The second interrogation signal is received at the first and second RFID tags in 2624. The first RFID tag either (1) rejects the second interrogation signal or (2) accepts the second interrogation signal and transmits an undetectable RF signal. The undetectable RF signal is a signal that is communicated at a frequency spectrum that does not allow a tag reader to detect the signal. In contrast, a detectable RF signal is transmitted from the second RFID tag as shown by 2628. The detectable RF signal is a signal that is communicated at a frequency spectrum that allows a tag reader to detect the signal. Accordingly, the detectable RF signal is deceived at the tag reader in 2630. The received RF signal is processed in 2632 to obtain the unique identifier therefrom. The unique identifier is forwarded along with a timestamp to the enterprise system. The unique identifier is also used to make a determination that the object resides on the structure. Subsequently, 2634 is performed where method 2600 ends or other processing is performed (e.g., return to 2602).

Figure 27A:
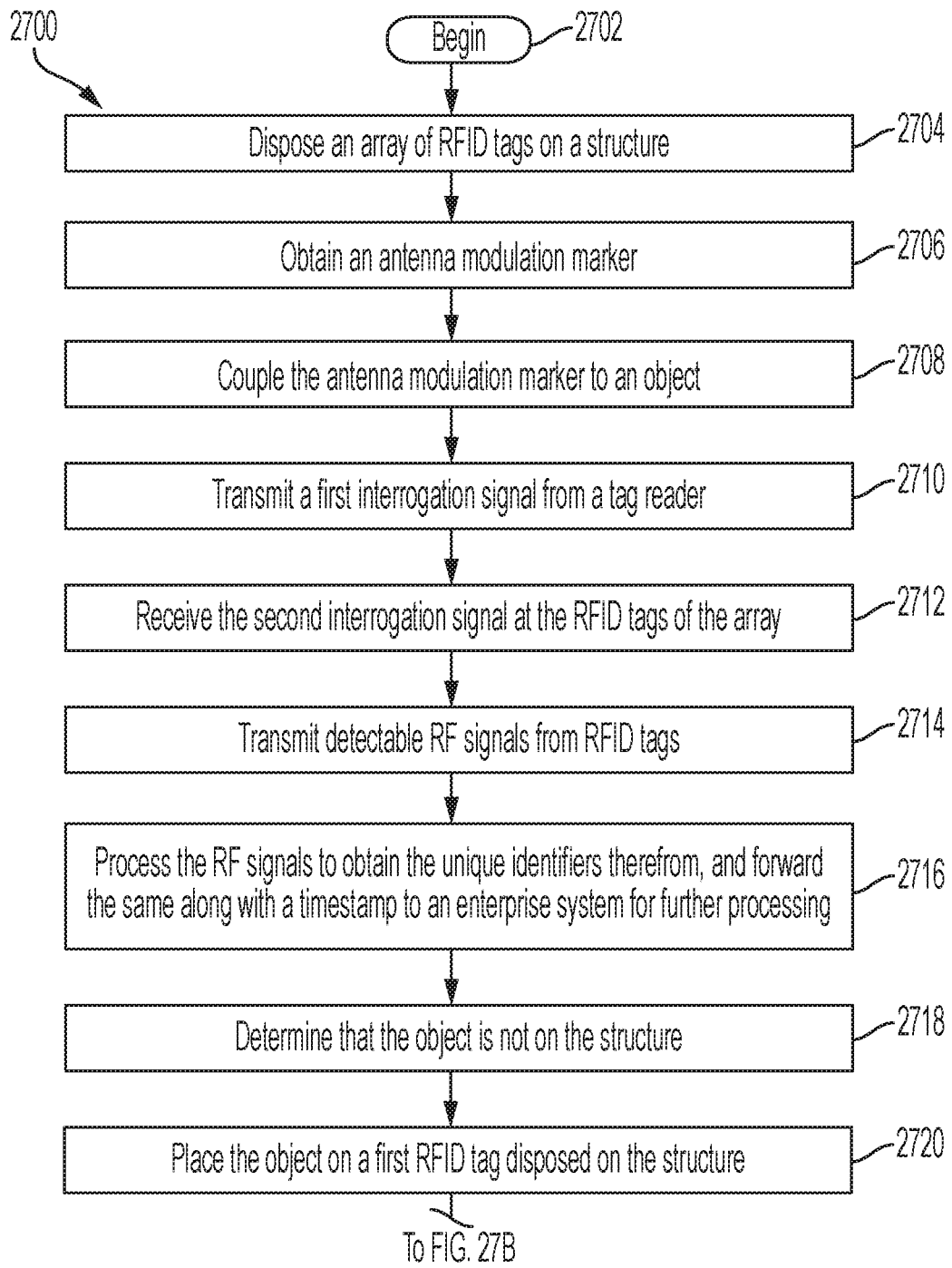
FIGS. 27A-B (collectively referred to as "FIG. 27") provides a flow diagram of another illustrative method for detecting or determining an object's location in a facility.
Figure 27B:
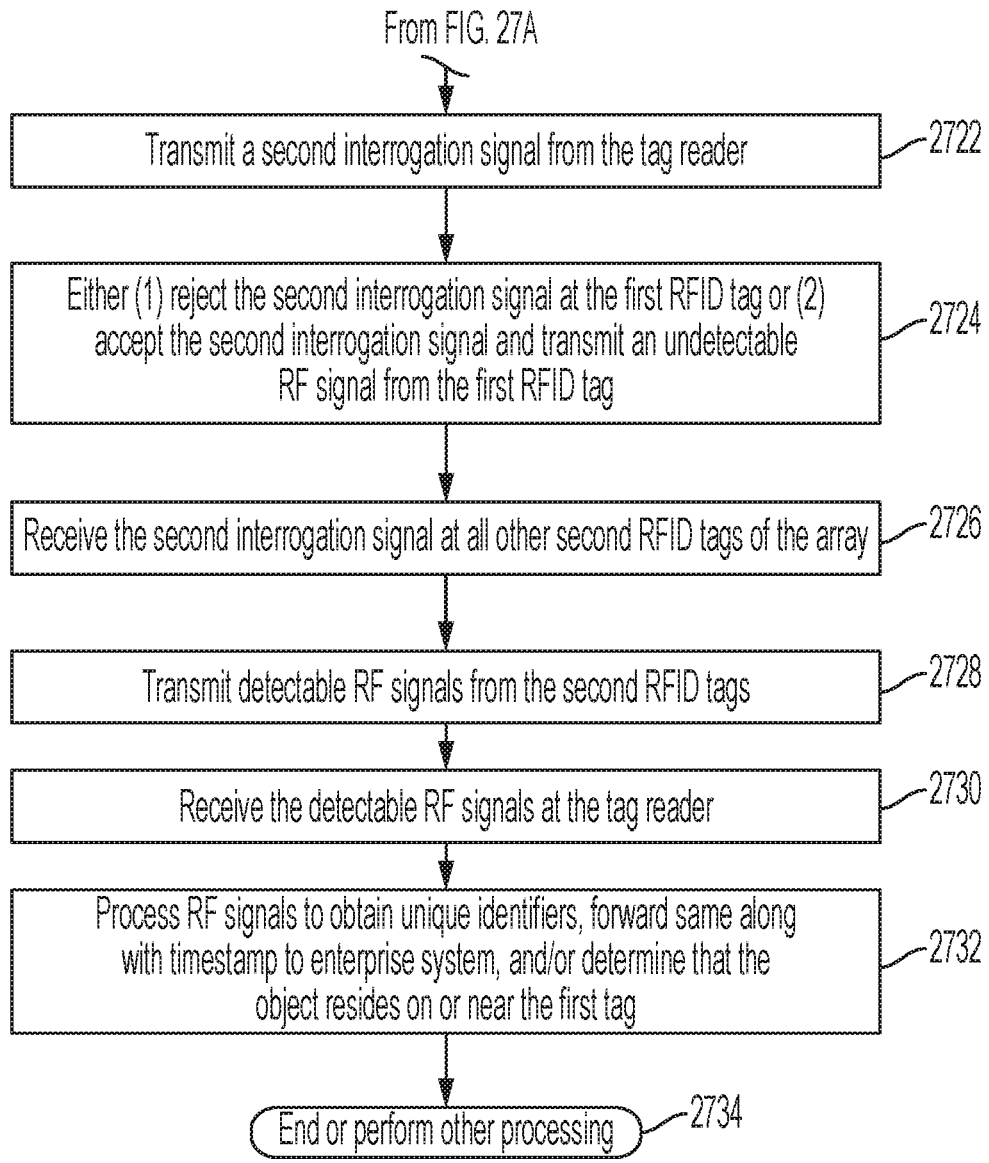

Referring now to FIG. 27, there is provided a flow diagram of an illustrative method 2700 for detecting or determining an object's (e.g., object 2206, 2208 of FIG. 22) location in a facility (e.g., RSF 2230 of FIG. 22). Method 2700 begins with 2702 and continues with 2704 where an array of RFID tags (e.g., RFID tags 2220 of FIG. 22) is disposed on a structure (e.g., equipment 2202 and/or shelf 2204₂ of FIG. 22). In 2706, an antenna modulation marker (e.g., antenna modulation marker 2218 of FIG. 22) is obtained. The antenna modulation marker is coupled to the object in 2708.

Thereafter in 2710, a first interrogation signal is transmitted from a tag reader (e.g., tag reader 2232 of FIG. 22). The second interrogation signal is received at the RFID tags of the array in 2712. Detectable RF signals are transmitted from the RFID tags in 2714. In 2716, the RF signals are received at the tag reader and processed to obtain the unique identifiers therefrom. The unique identifiers are sent along with one or more timestamps to an enterprise system (e.g., enterprise system 2234 of FIG. 22) for further processing. The unique identifiers are used on 2718 to make a determination that the object is not on the structure.

In 2720, the object is placed on the structure such that it resides in proximity to and/or above a first RFID tag of the array. A second interrogation signal is transmitted from the tag reader in 2722. In 2724, the first RFID tag either (1) rejects the second interrogation signal or (2) accepts the second interrogation signal and transmits an undetectable RF signal. In contrast, all other RFID tags of the array transmit detectable RF signals in response to the second interrogation signal, as shown by 2726-2728. The detectable RF signals are received by the tag reader in 2730. The received RF signals are processed to obtain unique identifiers therefrom. The unique identifiers are sent along with one or more time stamps to the enterprise system. The unique identifiers are used to make a determination that the object resides in proximity to or on the first RFID tag. Subsequently, 2734 is performed where method 2700 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a tag system, comprising:
    wirelessly communicating, from a tag, a first signal at a first frequency spectrum that allows a tag reader to detect the first signal, when the tag is not proximate to an antenna modulation marker or when the antenna modulation marker has a first orientation relative to the tag; and
    performing operations by the tag to either wirelessly communicate a second signal at a second frequency spectrum that does not allow the tag reader to detect the first signal, when the tag is proximate to the antenna modulation marker or when the antenna modulation marker has a second orientation relative to the tag, wherein the second orientation is different than the first orientation.

2. The method according to claim 1, wherein the tag is coupled to a first item and the antenna modulation marker is coupled to a second item.

3. The method according to claim 2, wherein the first item comprises an object that is part of an inventory and the second item comprises storage equipment that is part of an infrastructure for storing the inventory.

4. The method according to claim 2, wherein the first item comprises storage equipment that is part of an infrastructure for storing inventory and the second item comprises an object that is part of the inventory.

5. The method according to claim 2, wherein the first item comprises a support plate of a depressible button and the second item comprises at least one resilient member coupled to the support plate of the depressible button.

6. The method according to claim 2, wherein the first item comprises a stationary part of a rotary knob and the second item comprises a rotatable part of the rotary knob.

7. The method according to claim 2, wherein the first item comprises a rotatable part of a rotary knob and the second item comprises a stationary part of the rotary knob.

8. The method according to claim 1, wherein the antenna modulation marker is configured to modulate a communications behavior of the tag.

9. The method according to claim 8, further comprising, by the antenna modulation marker, modulating the communications behavior of the tag by changing a resonant frequency of the tag, attenuating an amplitude of a signal generated by the tag, shifting a phase of the signal generated by the tag, or changing a polarization of a backscatter signal.

10. The method according to claim 1, wherein the antenna modulation marker comprises a plurality of conductive traces disposed on a substrate.

11. The method according to claim 10, wherein elongate lengths of the conductive traces are angled relative to a dipole antenna direction of the tag when the antenna modulation marker is in the first orientation.

12. The method according to claim 10, wherein elongate lengths of the conductive traces extend parallel to a dipole antenna direction of the tag when the antenna modulation marker is in the second orientation.

13. A tag system, comprising:
a tag reader;
a tag comprising an antenna that is coupled to a first item; and
an antenna modulation marker that is coupled to a second item and configured to modulate a communications behavior of the tag's antenna;
wherein:
the tag is configured to wirelessly communicate a signal at a first frequency spectrum that allows the tag reader to detect the first signal, when the tag is not proximate to the antenna modulation marker or the antenna modulation marker has a first orientation relative to the tag; and
perform operations to wirelessly communicate a second signal at a second frequency spectrum that does not allow the tag reader to detect the first signal, when the tag is proximate to the antenna modulation marker or the antenna modulation marker has a second different orientation relative to the tag.

14. The tag system according to claim 13, wherein:
the first item comprises an object that is part of an inventory; and
the second item comprises storage equipment that is part of an infrastructure for storing the inventory.

15. The tag system according to claim 13, wherein:
the first item comprises storage equipment that is part of an infrastructure for storing inventory; and
the second item comprises an object that is part of the inventory.

16. The tag system according to claim 13, wherein:
the first item comprises a support plate of a depressible button; and
the second item comprises at least one resilient member coupled to the support plate of the depressible button.

17. The tag system according to claim 13, wherein:
the first item comprises a stationary part of a rotary knob; and
the second item comprises a rotatable part of the rotary knob.

18. The tag system according to claim 13, wherein:
the first item comprises a rotatable part of a rotary knob; and
the second item comprises a stationary part of the rotary knob.

19. The tag system according to claim 13, wherein the modulation of the communications behavior of the tag is achieved by changing a resonant frequency of the tag, attenuating an amplitude of a signal generated by the tag, shifting a phase of the signal generated by the tag, or changing a polarization of a backscatter signal.

20. The tag system according to claim 13, wherein the antenna modulation marker comprises a plurality of conductive traces disposed on a substrate.

21. The tag system according to claim 20, wherein elongate lengths of the conductive traces are angled relative to a dipole antenna direction of the tag when the antenna modulation marker is in the first orientation.

22. The tag system according to claim 20, wherein elongate lengths of the conductive traces extend parallel to a dipole antenna direction of the tag when the antenna modulation marker is in the second different orientation.

* * * * *